(12) United States Patent
Nishikawa et al.

(10) Patent No.: US 9,723,569 B2
(45) Date of Patent: Aug. 1, 2017

(54) RADIO COMMUNICATION SYSTEM, RADIO BASE STATION APPARATUS, USER TERMINAL AND RADIO COMMUNICATION METHOD

(75) Inventors: Daisuke Nishikawa, Tokyo (JP); Satoshi Nagata, Tokyo (JP); Tetsushi Abe, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 69 days.

(21) Appl. No.: 14/238,148

(22) PCT Filed: Jul. 20, 2012

(86) PCT No.: PCT/JP2012/068459
§ 371 (c)(1),
(2), (4) Date: Feb. 26, 2014

(87) PCT Pub. No.: WO2013/024662
PCT Pub. Date: Feb. 21, 2013

(65) Prior Publication Data
US 2014/0179363 A1 Jun. 26, 2014

(30) Foreign Application Priority Data
Aug. 12, 2011 (JP) ................................. 2011-177267

(51) Int. Cl.
*H04B 7/00* (2006.01)
*H04W 52/24* (2009.01)
(Continued)

(52) U.S. Cl.
CPC ....... *H04W 52/241* (2013.01); *H04L 27/2614* (2013.01); *H04W 52/146* (2013.01);
(Continued)

(58) Field of Classification Search
CPC ............ H04L 27/2614; H04W 52/146; H04W 52/241; H04W 52/242; H04W 52/244;
(Continued)

(56) References Cited

U.S. PATENT DOCUMENTS

2008/0045259 A1 2/2008 Shen et al.
2010/0099429 A1 4/2010 Ishii et al.
(Continued)

FOREIGN PATENT DOCUMENTS

JP 2011-9866 A 1/2011
JP 2011-91786 A 5/2011
(Continued)

OTHER PUBLICATIONS

3GPP TS 36.213 V10.1.0 (Mar. 2011), Release 10, p. 18, section 5.1.3.*
(Continued)

*Primary Examiner* — Ankur Jain
(74) *Attorney, Agent, or Firm* — Osha Liang LLP

(57) ABSTRACT

The present invention is designed to provide a radio communication system which can control uplink transmission power adequately even in an HetNet environment. A radio communication system having a first radio base station apparatus and a second radio base station apparatus that is configured to able to communicate with the first radio base station apparatus is provided; and, in this radio communication system, the first radio base station apparatus has a first communication quality measurement section that measures the received quality of an uplink reference signal transmitted from a user terminal, and generates first received quality information, and a reporting section that reports the first communication quality information to the second radio base station apparatus, and the second radio base station apparatus has a second communication quality measurement sec- (Continued)

tion that measures the received quality of the uplink reference signal transmitted from the user terminal, and generates second communication quality information, a correction value determining section that determines a correction value for the transmission power of the user terminal on the uplink based on the first communication quality information and the second communication quality information, and a reporting section that reports the determined correction value to the user terminal.

7 Claims, 13 Drawing Sheets

(51) Int. Cl.
*H04L 27/26* (2006.01)
*H04W 52/14* (2009.01)
*H04W 52/40* (2009.01)

(52) U.S. Cl.
CPC ........ *H04W 52/242* (2013.01); *H04W 52/244* (2013.01); *H04W 52/245* (2013.01); *H04W 52/247* (2013.01); *H04W 52/248* (2013.01); *H04W 52/40* (2013.01)

(58) Field of Classification Search
CPC ............. H04W 52/245; H04W 52/247; H04W 52/248; H04W 52/40
USPC ........................................................ 455/522
See application file for complete search history.

(56) References Cited

U.S. PATENT DOCUMENTS

| | | | |
|---|---|---|---|
| 2010/0331037 A1* | 12/2010 | Jen ...................... | H04W 52/146 455/522 |
| 2011/0070884 A1 | 3/2011 | Choi et al. | |
| 2011/0098054 A1* | 4/2011 | Gorokhov .............. | H04B 7/024 455/452.1 |
| 2011/0134759 A1* | 6/2011 | Kim ..................... | H04W 52/146 370/242 |
| 2012/0127911 A1 | 5/2012 | Nishikawa et al. | |
| 2012/0149296 A1 | 6/2012 | Sawai | |
| 2012/0207105 A1* | 8/2012 | Geirhofer ............. | H04L 5/0032 370/329 |
| 2012/0282889 A1 | 11/2012 | Tanaka et al. | |
| 2014/0050182 A1* | 2/2014 | Iwai ..................... | H04W 52/325 370/329 |
| 2014/0247814 A1* | 9/2014 | Zhang .................. | H04W 52/58 370/336 |

FOREIGN PATENT DOCUMENTS

| | | |
|---|---|---|
| JP | 2011-151471 A | 8/2011 |
| WO | 2008/108228 A1 | 9/2008 |
| WO | 2010/124241 A2 | 10/2010 |
| WO | 2011/019924 A1 | 2/2011 |

OTHER PUBLICATIONS

International Search Report for corresponding International Application No. PCT/JP212/068459, mailed Sep. 4, 2012 (4 pages).
ETSI TS 136 213 V10.1.0; "LTE; Evolved Universal Terrestrial Radio Access (E-UTRA); Physical layer procedures (3GPP TS 36.213 version 10.1.0 Release 10);" Apr. 2011 (117 pages).
Office Action in counterpart Japanese Patent Application No. 2011-177267, mailed Jun. 2, 2015 (5 pages).
Office Action issued in corresponding European Application No. 12824133.8, mailed Mar. 16, 2016 (7 pages).
Extended European Search Report issued in corresponding European Patent Application No. 12824133.8, mailed Apr. 30, 2015 (17 pages).
Office Action issued in corresponding European Application No. 12824133.8, mailed Jul. 6, 2016 (5 pages).
Office Action issued in the counterpart European Patent Application No. 12824133.8, mailed Nov. 22, 2016 (4 pages).

* cited by examiner

RADIO COMMUNICATION SYSTEM, RADIO BASE STATION APPARATUS, USER TERMINAL AND RADIO COMMUNICATION METHOD

TECHNICAL FIELD

The present invention relates to a radio communication system, a radio base station apparatus, a user terminal and a radio communication method that are applicable to a cellular system and so on.

BACKGROUND ART

Presently, in the 3GPP (Third Generation Partnership Project), the standardization of LTE-advanced (hereinafter the LTE Release 10 specifications and the specifications of later versions will be collectively referred to as "LTE-A"), which is an evolved radio interface of the LTE (Long Term Evolution) Release 8 specifications (hereinafter referred to as "LTE" or "Rel. 8"), is in progress. LTE-A is attempting to realize higher system performance than LTE, while maintaining backward compatibility with LTE.

In the uplink of the LTE system, SC-FDMA (Single-Carrier Frequency Division Multiple Access), which realizes a low peak-to-average power ratio (PAPR) and which is effective to expand coverage, is employed. With this method, radio resources of a given frequency and time are allocated to one user terminal (UE: User Equipment) according to scheduling by a radio base station apparatus (eNB: evolved NodeB), so that user terminals in the same cell do not interfere with each other. However, the LTE system is based on one-cell frequency reuse, which uses the same frequency in all cells, and therefore the interference level from user terminals that are located on cell edges in surrounding cells is particularly high. Consequently, to compensate for such interference from surrounding cells and maintain certain received quality, measures against inter-cell interference become necessary.

To measure against inter-cell interference, the uplink transmission power control plays a significant role. A radio base station apparatus is required to control the transmission power of a user terminal to fulfill the required received quality, taking into account the propagation loss between the user terminal and the radio base station apparatus, and interference to be given against surrounding cells. In the LTE system, fractional transmission power control is employed as a transmission power control method to take inter-cell interference into account.

In the uplink of the LTE system (the PUSCH (Physical Uplink Shared Channel), the PUCCH (Physical Uplink Control Channel), and the SRS (Sounding Reference Signal)), transmission power is controlled by combining an open loop control and a closed loop control. The open loop control is executed using parameters which a radio base station apparatus reports in a comparatively long cycle, and the propagation loss measured by a user terminal. The closed loop control is executed using TPC commands which a radio base station apparatus reports in a comparatively short cycle, based on the conditions of communication (for example, the received SINR (Signal to Interference plus Noise Ratio) at the radio base station apparatus) between the radio base station apparatus and the user terminal.

For example, the transmission power of the PUSCH is controlled according to following equation 1 (non-patent literature 1). In following equation 1, i is an index to represent a subframe, j is an index to represent the scheduling type, $P_{CMAX,c}(i)$ is the maximum possible transmission power of a user terminal, $M_{PUSCH,c}(i)$ is the frequency bandwidth that is used, $P_{O\_PUSCH,c}(j)$ is the basic transmission power of the PUSCH, $PL_C$ is the propagation loss, $\alpha_C(j)$ is a propagation loss coefficient, $\Delta_{TF,c}(j)$ is the amount of offset per format that is used, and $f_c(i)$ is the amount of offset based on TPC commands.

[Formula 1]

$$P_{PUSCH,c}(i) = \\ \min\{P_{CMAX,c}(i), 10\log_{10}(M_{PUSCH,c}(i)) + P_{O\_PUSCH,c}(j) + \\ \alpha_c(j) \cdot PL_c + \Delta_{TF,c}(i) + f_c(i)\}$$

(Equation 1)

CITATION LIST

Non-Patent Literature

Non-Patent Literature 1: 3GPP, TS 36.213, V10.1.0, "Evolved Universal Terrestrial Radio Access (E-UTRA) semikoron Physical layer procedures"

SUMMARY OF THE INVENTION

Technical Problem

In the LTE-A system, an HetNet (Heterogeneous Network) to form, for example, a micro cell (for example, a pico cell, a femto cell, and so on), which has a local coverage area of a radius of approximately several tens of meters, in a macro cell, which has a wide coverage area of a radius of approximately several kilometers, is under study. In this HetNet, the radio base station apparatus (macro base station) to form the macro cell may be connected with the radio base station apparatus (pico base station) to form the pico cell via an optical channel and/or the like. Between the macro base station and the pico base station, a user terminal communicates with the one that is suitable to communicate with, or communicates with both radio base station apparatuses.

In the above case, optimal uplink transmission power may vary depending on the conditions of communication between each radio base station apparatus and the user terminal. However, since transmission power control known heretofore is not necessarily suitable for operation in a HetNet environment, there is a threat that, if conventional transmission power control is applied to the LTE-A system where a HetNet is adopted, uplink transmission power cannot be controlled adequately. As a result of this, there is a threat that inter-cell interference cannot be suppressed sufficiently, and the uplink communication quality becomes lower.

The present invention has been made in view of the above, and it is therefore an object of the present invention to provide a radio communication system, a radio base station apparatus, a user terminal, and a radio communication method which can control uplink transmission power adequately even in a HetNet environment.

Solution to Problem

A radio communication system according to the present invention is a radio communication system to have a first radio base station apparatus and a second radio base station apparatus that is configured to be able to communicate with the first radio base station apparatus, and, in this radio communication system: the first radio base station apparatus has: a first communication quality measurement section that measures received quality of an uplink reference signal transmitted from a user terminal, and generates first received quality information; and a reporting section that reports the first communication quality information to the second radio base station apparatus; and the second radio base station apparatus has: a second communication quality measurement section that measures received quality of the uplink reference signal transmitted from the user terminal, and generates second communication quality information; a correction value determining section that determines a correction value for transmission power of the user terminal on an uplink based on the first communication quality information and the second communication quality information; and a reporting section that reports the determined correction value to the user terminal.

A radio communication method according to the present invention includes: a step in which a user terminal transmits an uplink reference signal to a first radio base station apparatus and a second radio base station apparatus; a step in which the first radio base station apparatus measures received quality of the uplink reference signal and generates first communication quality information; a step in which the second radio base station apparatus measures received quality of the uplink reference signal and generates second communication quality information; a step in which the first radio base station apparatus reports the first communication quality information to the second radio base station apparatus; a step in which the second radio base station apparatus determines a correction value for transmission power of the user terminal on an uplink based on the first communication quality information and the second communication quality information; a step in which the determined correction value is reported to the user terminal; and a step in which the user terminal sets the transmission power on the uplink based on the correction value.

A radio base station apparatus according to the present invention is a radio base station apparatus that is configured to be able to communicate with another radio base station apparatus, and has: a communication quality measurement section that measures received quality of an uplink reference signal transmitted from a user terminal, and generates communication quality information; a receiving section that receives communication quality information that is generated in the other radio base station apparatus by measuring received quality of the uplink reference signal transmitted from the user terminal; a correction value determining section that determines a correction value for transmission power of the user terminal on an uplink based on the communication quality information, and the communication quality information by the other radio base station apparatus; and a reporting section that reports the determined correction value to the user terminal.

A user terminal according to the present invention has: a transmission section that transmits an uplink reference signal to a first radio base station apparatus and a second radio base station apparatus that are configured to be able to communicate with each other; a receiving section that receives a correction value for transmission power on an uplink, determined by the first radio base station apparatus or the second radio base station apparatus based on received quality of the uplink reference signal at each radio base station apparatus; and a setting section that sets the transmission power on the uplink based on the correction value.

Technical Advantage of the Invention

According to the present invention, it is possible to provide a radio communication system, a radio base station apparatus, a user terminal, and a radio communication method which can control uplink transmission power adequately even in HetNet environment.

DESCRIPTION OF EMBODIMENTS

Figure 1:
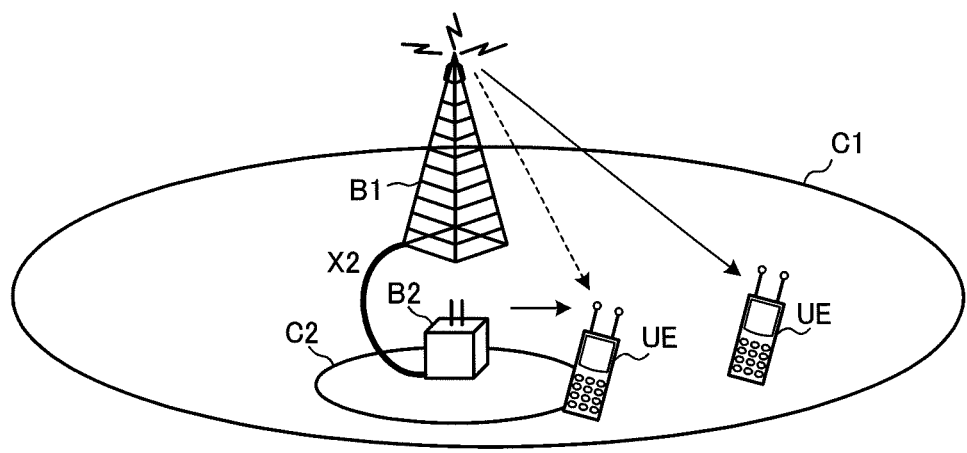
FIG. 1 is a schematic configuration diagram of a radio communication system according to an embodiment.

FIG. 1 is a schematic configuration diagram of a radio communication system according to an embodiment of the present invention. The radio communication system shown in FIG. 1 is configured to include a radio base station apparatus (macro base stations) B1 that forms a macro cell C1, a radio base station apparatus (pico base stations) B2 that forms a pico cell C2, and a user terminal UE. Note that, in the radio communication system, a plurality of radio base station apparatuses (macro base station) B1, radio base station apparatuses (pico base station) B2 and user terminals UE may be present.

As shown in FIG. 1, the macro base station B1 and the pico base station B2 are connected via cable (for example, via an X2 interface). Also, the macro base station B1 and the pico base station B2 are each connected to a core network (not shown).

The LTE-A system shown in FIG. 1 assumes a HetNet configuration, which places significance on the local area environment. A HetNet is a layered network, in which, in addition to the existing macro cell C1, various forms of cells such as the pico cell C2, a femto cell and so on (small-size cells)—in particular, cells of varying downlink transmission power—are overlaid. In this HetNet, the downlink transmission power of the macro base station B1 of the macro cell C1, which covers a relatively wide area, is set greater than that of the pico base station B2 of the pico cell C2, which covers a relatively narrow area.

In the LTE-A system, the uplink transmission power of a user terminal is set to lower the interference level against surrounding cells. That is to say, the transmission power of a user terminal is controlled to fulfill the required received quality, taking into account the propagation loss (path loss) between the user terminal and the serving radio base station apparatus, and the interference to be given against surrounding cells.

The transmission power of the PUSCH, the PUCCH and the SRS on the uplink is controlled by combining an open loop control and a closed loop control. The open loop control is executed using parameters which the radio base station apparatus reports in a comparatively long cycle, and the propagation loss measured by the user terminal. The closed loop control is executed using TPC commands which the radio base station apparatus reports in a comparatively short cycle, based on the conditions of communication (for example, the received SINR (Signal to Interference plus Noise Ratio) at the radio base station apparatus) between the radio base station apparatus and the user terminal.

The transmission power of the PUSCH can be represented by following equation 1. In following equation 1, i is an index to represent a subframe, j is an index to represent the scheduling type of the PUSCH, and parameters that relate to the open loop control include the parameter $P_{O\_PUSCH,c}(j)$ to represent the approximate target received power of the PUSCH, the frequency bandwidth that is used, $M_{PUSCH,c}(i)$, the propagation loss $PL_c$, a fractional transmission power control coefficient $\alpha_c(j)$, and the offset value $\Delta_{TF,c}(j)$ to suit the transmission format. Parameters that relate to the closed loop control include the amount of offset $f_c(i)$ based on TPC commands. For the transmission power of the PUSCH, the smaller one of the power determined by the above-described open loop control and closed loop control and the maximum possible transmission power $P_{CMAX,c}(i)$ of the user terminal is selected.

[Formula 2]

$$P_{PUSCH,c}(i) = \\ \min\{P_{CMAX,c}(i), 10\log_{10}(M_{PUSCH,c}(i)) + P_{O\_PUSCH,c}(j) + \\ \alpha_c(j) \cdot PL_c + \Delta_{TF,c}(i) + f_c(i)\}$$

(Equation 1)

The transmission power of the PUCCH can be represented by following equation 2. In following equation 2, parameters that relate to the open loop control include the parameter $P_{O\_PUCCH}$ to represent the approximate target received power of the PUCCH, the propagation loss $PL_c$, the offset $h(n_{CQI}, n_{HARQ}, n_{SR})$ to suit the content of transmission, the offset value $\Delta_{F\_PUCCH}(F)$ to suit the transmission format, and the offset value $\Delta_{TxD}(F')$ to suit the PUCCH transmission diversity. Parameters that relate to the closed loop control include the amount of offset g(i) based on TPC commands. For the transmission power of the PUCCH, the smaller one of the transmission power value that is determined by the above-described open loop control and closed loop control, and the maximum possible transmission power $P_{CMAX,c}(i)$ of the user terminal is selected.

[Formula 3]

$$P_{PUCCH}(i) = \\ \min\{P_{CMAX,c}(i), P_{0\_PUCCH} + PL_c + h(n_{CQI}, n_{HARQ}, n_{SR}) + \\ \Delta_{F\_PUCCH}(F) + \Delta_{TxD}(F') + g(i)\}$$

(Equation 2)

The transmission power of the SRS can be represented by following equation 3. In following equation 3, $P_{SRS\_OFFSET,c}(m)$ is the amount of offset from the PUSCH transmission power per SRS type m, $M_{SRS,c}$ is the transmission frequency bandwidth of the SRS, and the other parameters are the same as in equation 1 for the PUSCH transmission power. For the transmission power of the SRS, the smaller one of the transmission power value determined in the above-described open loop control and closed loop control and the maximum possible transmission power $P_{CMAX,c}(i)$ of the user terminal is selected.

[Formula 4]

$$P_{SRS,c}(i) = \\ \min\{P_{CMAX,c}(i), P_{SRS\_OFFSET,c}(m) + 10\log_{10}(M_{SRS,c}) + \\ P_{O\_PUSCH,c}(j) + \alpha_c(j) \cdot PL_c + f_c(i)\}$$

(Equation 3)

The propagation loss $PL_c$ that is used for the open loop control in above equations 1 to 3 is determined based on the received level of CRSs (Cell-specific Reference Signals) received at the user terminal on the downlink. The CRSs are multiplexed on each subframe and used to demodulate the downlink data signal, and are also used in mobility measurement, channel quality information (CQI: Channel Quality Indicator) measurement and so on.

Figure 2:
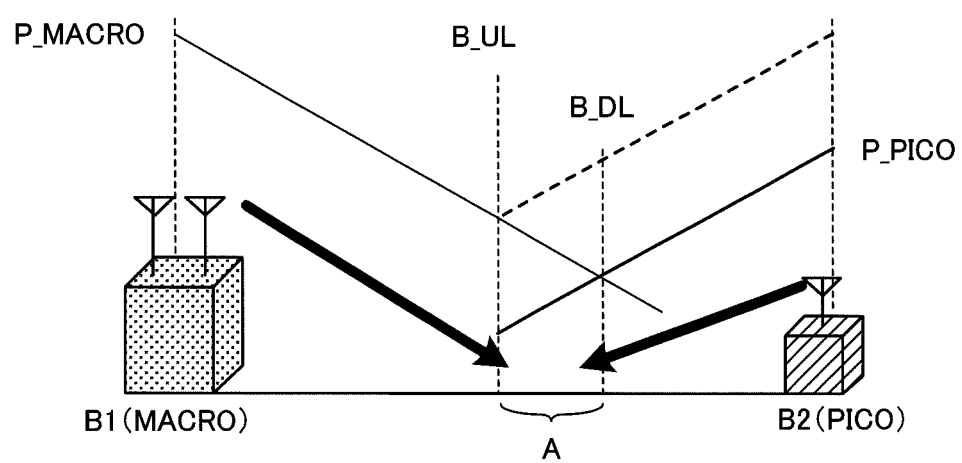
FIG. 2 is a schematic diagram to show the boundaries between connecting cells on the uplink and the downlink.

In a HetNet environment, there is a difference between the downlink transmission power of the macro base station B1 and the downlink transmission power of the pico base station B2. Consequently, cases might occur where the optimal connecting cell on the downlink and the optimal connecting cell on the uplink differ depending on the location of the user terminal and so on. FIG. 2 is a schematic diagram to show the boundaries between connecting cells on the uplink and the downlink. The optimal connecting cell on the downlink is the cell where the downlink received power from the radio base station apparatus is the maximum. Consequently, the boundary of the connecting cell on the downlink is B_DL, which is based on the received power of the user terminal UE, as shown in FIG. 2. Meanwhile, the optimal connecting cell on the uplink is the cell where the propagation loss is the minimum. Consequently, the boundary of the connecting cell on the uplink is B_UL, which is based on the propagation loss, as shown in FIG. 2.

When operation is carried out such that the connecting cells of the user terminal UE do not match between the uplink and the downlink, determining the propagation loss $PL_c$ based on the CRS received level might result in damaging its accuracy of estimation. For example, when a user terminal UE is located in the area A of FIG. 2, the user terminal UE connects with the macro base station B1 on the downlink and connects with the pico base station B2 on the uplink. A CRS is transmitted from the macro base station B1 on the downlink. Consequently, the propagation loss $PL_c$ is determined based on the conditions of communication between the macro base station B1 and the user terminal UE. However, it is the pico base station B2 that the user terminal UE connects with on the uplink. Consequently, when the uplink transmission power is controlled using the determined propagation loss $PL_c$, the accuracy of transmission power control may decrease. In this way, when the propagation loss $PL_c$ is not determined adequately, it becomes difficult to optimize transmission power, and it becomes not possible to suppress inter-cell interference sufficiently.

The present inventors have focused on problems with the method of determining the propagation loss $PL_c$ in a HetNet environment, and arrived at the present invention. The present invention is designed to realize an adequate transmission power control by estimating propagation loss by a different method. Now, specific examples will be described below.

First Example

Figure 3A:
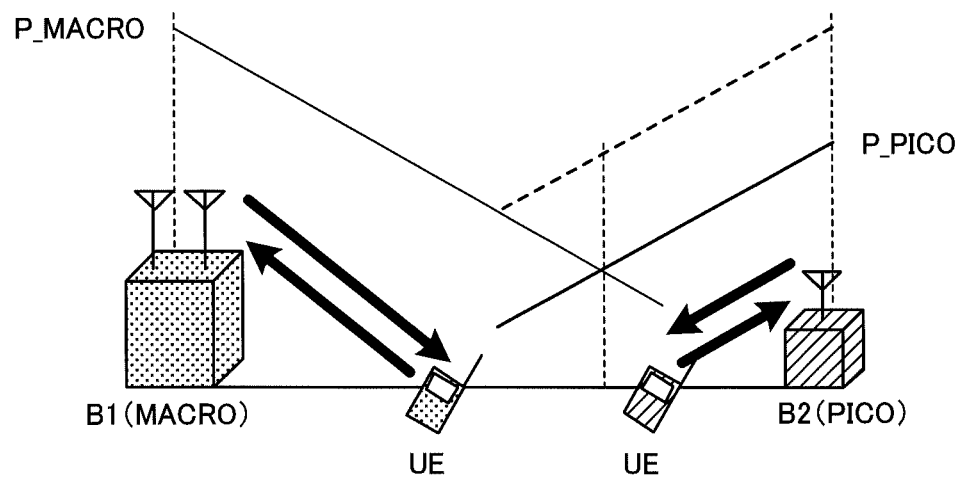
FIG. 3 provides schematic diagrams to explain the first example of uplink transmission power control.
Figure 3B:
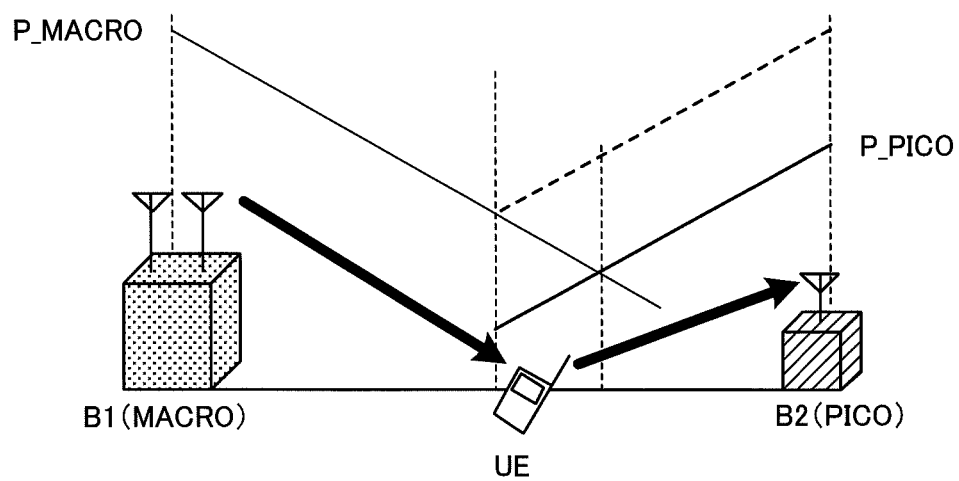

FIG. 3 provides schematic diagrams to explain the first example of uplink transmission power control in a HetNet environment. FIG. 3A shows a case where the user terminals connect with the same cells between the uplink and the downlink, and FIG. 3B shows a case where the user terminals connect with different cells between the uplink and the downlink. Note that, here, separate identification codes (cell IDs) are assigned to the macro base station B1 and the pico base station B2. Also, although a case will be described in the following description where there is one pico base station that is configured to be able to communicate with the macro base station B1, it is equally possible to provide a plurality of pico base stations.

As shown in FIG. 3A, when a user terminal connects with the same cell between the uplink and the downlink, the propagation loss $PL_c$ can be determined accurately, based on the received level of the CRS which the user terminal UE receives on the downlink. When the connecting cell is different between the uplink and the downlink, it is not possible to determine the propagation loss $PL_c$ to suit the uplink transmission power control, from the received level of the CRS. This is because, when the connecting cell differs between the uplink and the downlink, the radio base station apparatus to transmit the CRS to the user terminal on the downlink and the radio base station apparatus which the user terminal connects with on the uplink are different. In FIG. 3B, the user terminal UE connects with the macro base station B1 on the downlink and connects with the pico base station B2 on the uplink. In this case, the propagation loss $PL_c$ that is estimated based on the CRS received level relies on the downlink propagation path (the propagation path between the macro base station B1 and the user terminal UE), but does not rely on the uplink propagation path that is in fact subject to power control (the propagation path between the pico base station B1 and the user terminal UE).

To control uplink transmission power accurately even when the connecting cell varies between the uplink and the downlink, the amount of offset (correction value) for correcting the propagation loss $PL_c$ is reported to the user terminal UE. Also, in the algorithm of transmission power, the amount of offset (correction value) $\Delta_{HetNet}(i)$ is provided. In this case, the transmission power of the PUSCH can be represented by following equation 4, the transmission power of the PUCCH can be represented by following equation 5 and the transmission power of the SRS can be represented by following equation 6.

[Formula 5]

$$P_{PUSCH,c}(i) = \min\{P_{CMAX,c}(i), 10\log_{10}(M_{PUSCH,c}(i)) + P_{O\_PUSCH,c}(j) + \alpha_c(j) \cdot PL_c + \Delta_{TF,c}(i) + \Delta_{HetNet}(i) + f_c(i)\}$$ (Equation 4)

[Formula 6]

$$P_{PUCCH}(i) = \min\{P_{CMAX,c}(i), P_{O\_PUCCH} + PL_c + h(n_{CQI}, n_{HARQ}, n_{SR}) + \Delta_{F\_PUCCH}(F) + \Delta_{TxD}(F') + \Delta_{HetNet}(i) + g(i)\}$$ (Equation 5)

[Formula 7]

$$P_{SRS,c}(i) = \min\{P_{CMAX,c}(i), P_{SRS\_OFFSET,c}(m) + 10\log_{10}(M_{SRS,c}) + P_{O\_PUSCH,c}(j) + \alpha_c(j) \cdot PL_c + \Delta_{HetNet}(i) + f_c(i)\}$$ (Equation 6)

In above equations 4 to 6, the amount of offset $\Delta_{HetNet}(i)$ is the value determined based on the received level (received quality) of a reference signal (for example, an SRS) which each radio base station apparatus receives from the user terminal UE on the uplink. For example, the offset value $\Delta_{HetNet}(i)$ corresponds to the difference between the received level of the SRS received at the macro base station B1 and the received level of the SRS received at the pico base station B2. In the case shown in FIG. 3B, the received level of the SRS received at the macro base station B1 and the received level of the CRS received at the user terminal UE both rely on the propagation path between the macro base station B1 and the user terminal UE. Consequently, the received level of the SRS received at the macro base station B1 and the received level of the CRS received at the user terminal UE hold a corresponding relationship. The received level of the SRS received at the pico base station B2 relies on the propagation path between the pico base station B1 and the user terminal UE. That is to say, the received level of the SRS received at the pico base station B2 corresponds to the propagation loss that is originally required in uplink transmission power control. Consequently, as described above, by determining the amount of offset based on the received level of the SRS received at each radio base station apparatus from the user terminal UE, it is possible to correct the propagation loss $PL_c$ determined according to the received level of a CRS. Note that the amount of offset should by no means be determined based only on the SRS, but may be determined based on the received level of other reference signals or data signals transmitted from a user terminal on the uplink and received at each radio base station apparatus.

Alternately, referring to above equations 4 to 6, the amount of offset $\Delta_{HetNet}(i)$ may be determined based on the power headroom report (PHR), which is reported in the MAC layer on the uplink, and the received power of a data signal or a reference signal received at the pico base station B2 from the user terminal UE. The PHR refers to information that is reported from the user terminal UE regarding the use of power. For example, from the PHR which the user terminal UE reports on a regular basis in the MAC layer, the pico base station B2 to receive this is able to know the transmission power of the user terminal UE, including the propagation loss $PL_c$ measured and retained in the user terminal UE. That is to say, the pico base station B2 is able to learn the transmission power set at the user terminal UE from the PHR. Based on the difference between the transmission power of the user terminal UE and the actual received level (received quality), it is possible to calculate the actual propagation loss between the pico base station B2 and the user terminal UE. By setting and determining the difference between the propagation loss $PL_c$ measured by the user terminal UE and the actual propagation loss value calculated by the pico base station B2 as the amount of offset and reporting this to the user terminal UE on the downlink via the macro base station B1, it is possible to correct the transmission power error due to propagation loss.

In the case shown in FIG. 3B, the propagation loss $PL_c$ that is determined based on the received level of the CRS received at the user terminal UE from the macro base station B1 may be bigger than an appropriate value. In this case, the amount of offset $\Delta_{HetNet}(i)$ becomes a negative value, and the influence of the error of the propagation loss $PL_c$ on uplink transmission power is corrected.

Figure 4:
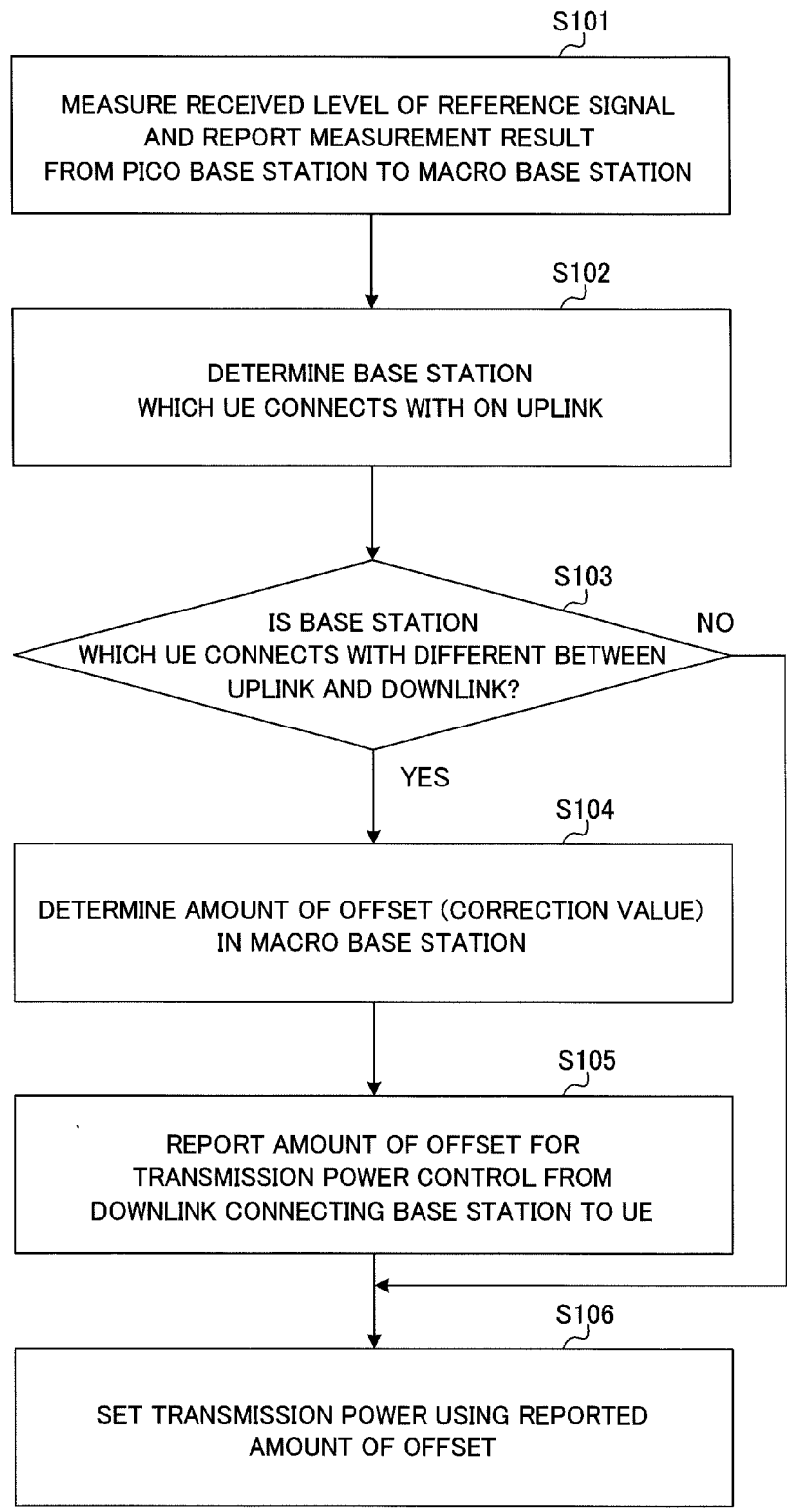
FIG. 4 is a control flowchart of the uplink transmission power control when reporting is executed by higher layer signaling.

FIG. 4 is an example of a control flowchart of the uplink transmission power control according to the first example. First, the macro base station B1 and the pico base station B2 each measure the received level of a reference signal (for example, an SRS) transmitted from the user terminal UE. The pico base station B2 reports the SRS received level measurement result to the macro base station B1 by backhaul (step S101). Note that the signal that is transmitted from the user terminal UE may be a reference signal other than an SRS. Next, the macro base station B1 determines the radio base station apparatus which the user terminal UE connects with on the uplink, based on the SRS received levels measured at the macro base station B1 and the pico base station B2 (step S102).

The macro base station B1 determines whether or not the radio base station apparatus which the user terminal UE connects with on the uplink and the radio base station apparatus which the user terminal UE connects with on the downlink are different (step S103). When the radio base station apparatus which the user terminal UE connects with on the uplink and the radio base station apparatus which the user terminal UE connects with on the downlink are different (step S103: YES), the macro base station B1 determines the amount of offset $\Delta_{HetNet}(i)$ to use in the uplink transmission power control for the user terminal UE, based on the SRS received levels measured at the macro base station B1 and the pico base station B2 (step S104). The determined amount of offset $\Delta_{HetNet}(i)$ is reported from the radio base station apparatus which the user terminal UE connects with on the downlink, to the user terminal UE, by higher layer signaling (for example, RRC (Radio Resource Control) signaling) (step S105). The user terminal UE sets the uplink transmission power based on information such as the reported amount of offset $\Delta_{HetNet}(i)$ and so on (see, for example, above equations 4 to 6), and performs uplink transmission (step S106).

Figure 5:
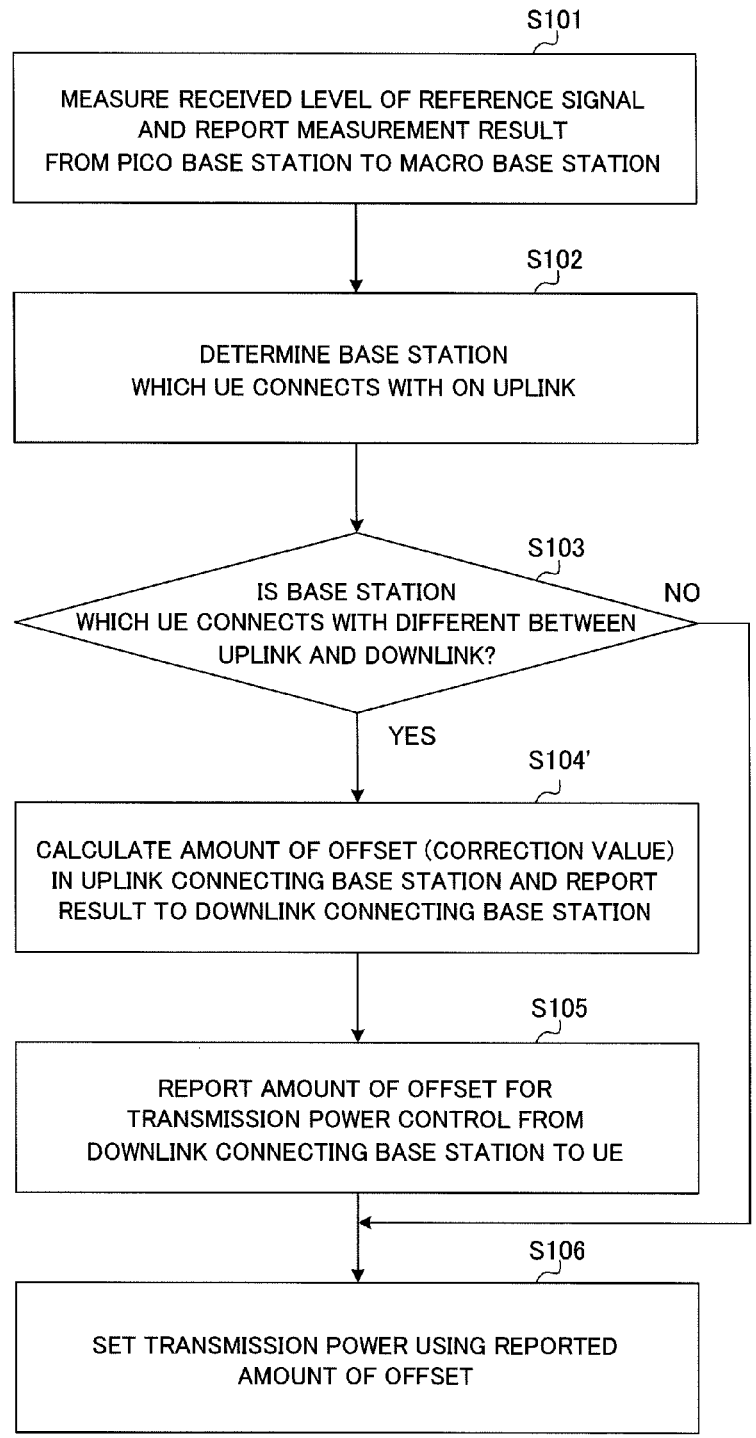
FIG. 5 is a control flowchart of the uplink transmission power control when transmission power is corrected based on the PHR (reported by higher layer signaling)

Note that when the amount of offset $\Delta_{HetNet}(i)$ is determined based on the PHR reported in the MAC layer on the uplink and the received power of a data signal or a reference signal received at the pico base station B2 from the user terminal UE, as shown in FIG. 5, step S104' may be provided instead of above step S104. In step S104', the uplink connecting base station (for example, the pico base station B2) is able to calculate the amount of offset $\Delta_{HetNet}(i)$ to use in the uplink transmission power control for the user terminal UE based on the measurement value of the received power of the data signal or reference signal transmitted from the user terminal UE, and the PHR reported from the user terminal UE.

When the radio base station apparatus to connect with on the uplink and the radio base station apparatus to connect with on the downlink are the same (step S103: NO), the user terminal UE sets the uplink transmission power without using information about the amount of offset $\Delta_{HetNet}(i)$, and performs uplink transmission (step S106).

Note that although, in the above example, the error of the propagation loss $PL_c$ is corrected by adding the amount of offset $\Delta_{HetNet}(i)$ to the open loop control, the correction may be made by other methods as well. For example, it is possible to correct the error of the propagation loss $PL_c$ using the amounts of offset $f_c(i)$ and $g(i)$ based on TPC commands of the closed loop control. In this case, the transmission power of the PUSCH can be represented by equation 1, the transmission power of the PUCCH can be represented by equation 2, and the transmission power of the SRS can be represented by equation 3. However, from the perspective of arriving at the required transmission power value, it is preferable to expand the number of bits in the transmission power control command (TPC command) field, which is provided in a downlink control signal, to three bits or more, and expand the step width of power values to be defined.

For example, it is preferable to expand the number of TPC command bits in the downlink control information (DCI) format to three bits, and use steps such as −5 dB, −3 dB, −1 dB, 0 dB, 1 dB, 3 dB, 5 dB and 7 dB. Note that, in this case, the amounts of offset $f_c(i)$ and $g(i)$ are controlled to correct the error of the propagation loss $PL_c$, based on the received level of a signal—for example, an SRS—received on the uplink at each radio base station apparatus. In this way, by expanding the number of TPC command bits and expanding the step width of power values, it is possible to shorten the period of time it takes to arrive at the required transmission power, compared to the case of not expanding the step width when the control is executed according to the amounts of offset $f_c(i)$ and $g(i)$ based on TPC commands of the closed loop control.

It is equally possible to correct the error of the propagation loss $PL_c$ using existing open loop control parameters. For example, it is possible to include and report the error of the propagation loss $PL_c$ (the correction value for the propagation loss $PL_c$) to be corrected, in UE-specific signaling of the above-described open loop control parameters $P_{O\_PUSCH,c}(j)$ and $P_{O\_PUCCH}$. However, from the perspective of covering the required correction error, it is preferable to expand the number of bits/range of both of UE-specific $P_{O\_PUSCH,c}(j)$ and $P_{O\_PUCCH}$, reported by RRC signaling, from existing four bits/[−8,+7] dB, to, for example, five bits/[−16, +15] dB or six bits/[−32, +31] dB. In this case, a configuration may be employed in which, in step S105 of above FIG. 4, power control information is reported to the user terminal UE, by RRC signaling, using expanded UE-specific open loop transmission power control parameters $P_{O\_PUSCH,c}(j)$ and $P_{O\_PUCCH}$.

Figure 6:
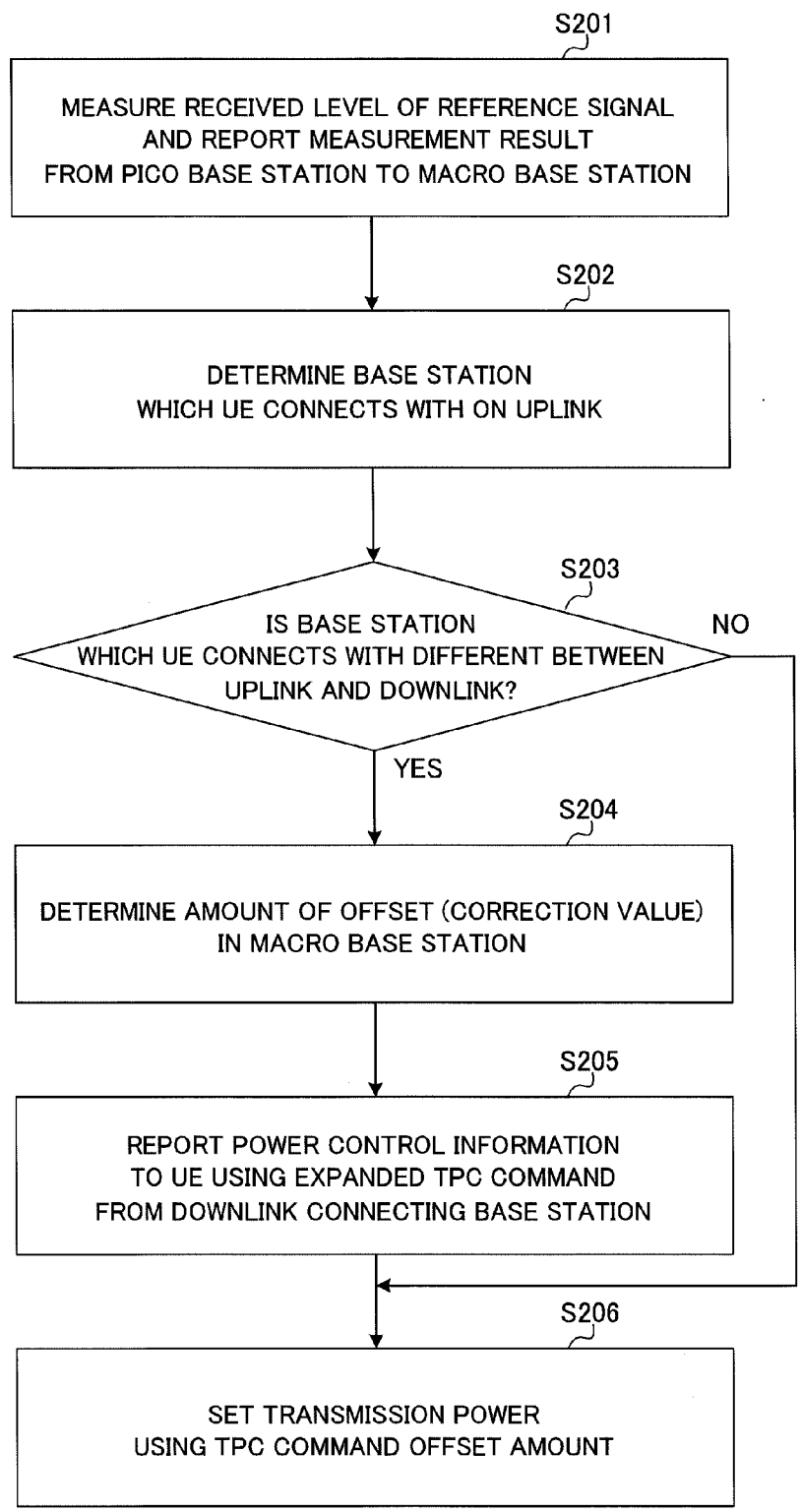
FIG. 6 is a control flowchart of the uplink transmission power control when transmission power is corrected according to the amount of offset based on TPC commands.

FIG. 6 is an example of a control flowchart of uplink transmission power control when transmission power is corrected using the amounts of offset $f_c(i)$ and $g(i)$ based on TPC commands or UE-specific $P_{O\_PUSCH,c}(j)$ and $P_{O\_PUCCH}$. First, the macro base station B1 and the pico base station B2 each measure the received level of the SRS transmitted from the user terminal UE. The pico base station B2 reports the SRS received level measurement result to the macro base station B1 by backhaul (step S201). Note that the signal that is transmitted from the user terminal UE may be a reference signal other than an SRS. Next, the macro base station B1 determines the radio base station apparatus which the user terminal UE connects with on the uplink, based on the received levels of the SRS measured at the macro base station B1 and the pico base station B2 (step S202).

The macro base station B1 determines whether or not the radio base station apparatus which the user terminal UE connects with on the uplink and the radio base station apparatus which the user terminal UE connects with on the downlink are different (step S203). When the radio base station apparatus which the user terminal UE connects with on the uplink and the radio base station apparatus which the user terminal UE connects with on the downlink are different (step S203: YES), the macro base station B1 calculates the amount of offset for the uplink transmission power of the user terminal UE based on the received levels of the SRS measured at the macro base station B1 and the pico base station B2 (step S204). Power control information is reported in the PDCCH using an expanded TPC command field of three bits or more, from the radio base station apparatus (for example, the macro base station B1) which the user terminal UE connects with on the downlink, to the user terminal UE, to fulfill the determined amount of offset (step S205). The user terminal UE sets the uplink transmission power based on information such as the reported amount of offset and so on, and performs uplink transmission (step S206).

Figure 7:
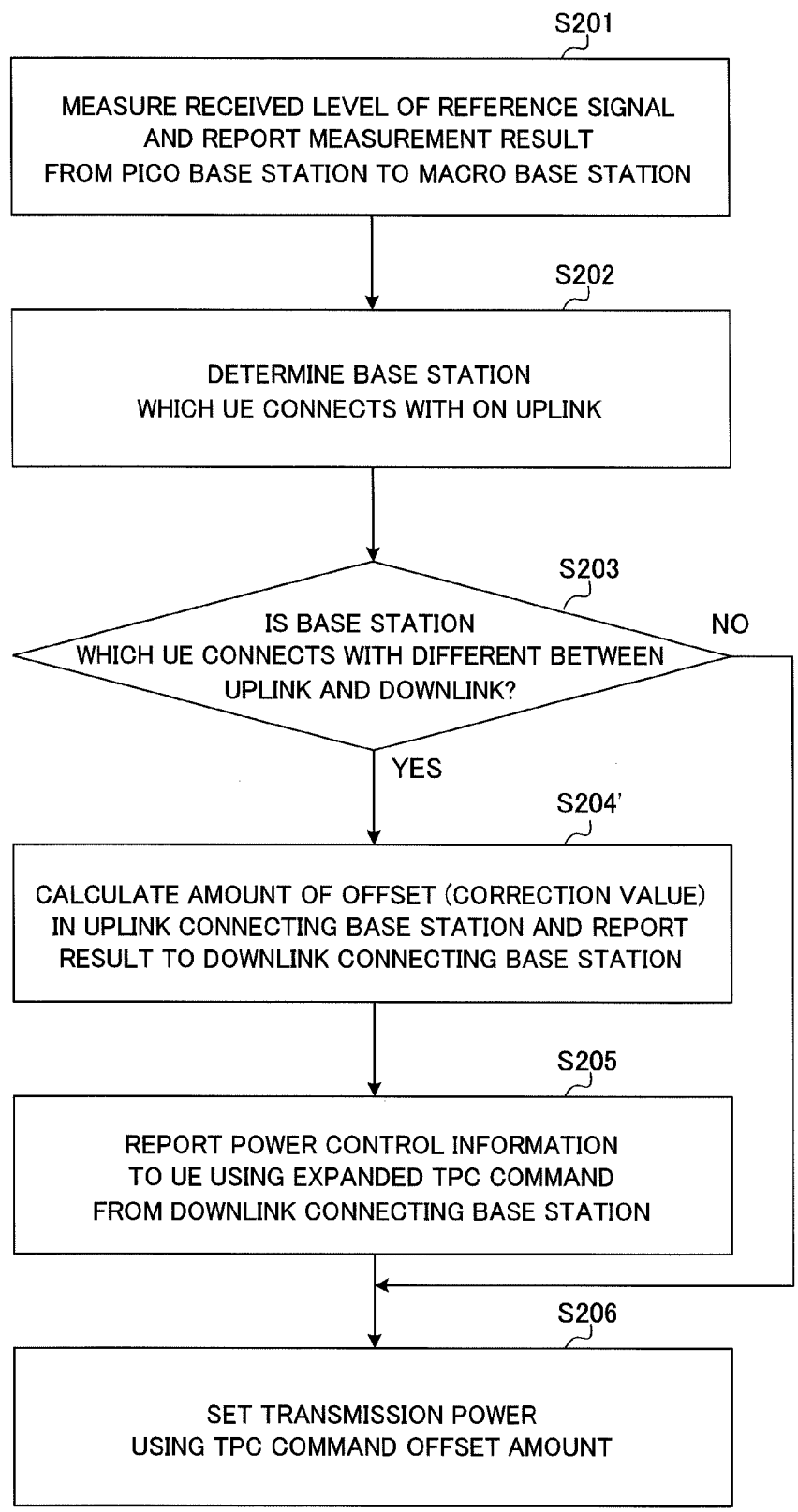
FIG. 7 is a control flowchart of the uplink transmission power control when transmission power is corrected based on the PHR (using TPC commands)

Note that when the amount of offset $\Delta_{HetNet}(i)$ is determined based on the PHR reported in the MAC layer on the uplink and the received power of a data signal or a reference signal received at the pico base station B2 from the user terminal UE, step S204' may be provided, instead of above step S204, as shown in FIG. 7. In step S204', the uplink connecting base station (for example, the pico base station B2) is able to determine the amount of offset $\Delta_{HetNet}(i)$ to be used in the uplink transmission power control for the user terminal UE, based on the measurement value of the received power of the data signal or reference signal transmitted from the user terminal UE, and the PHR reported from the user terminal UE.

When the radio base station apparatus to connect with on the uplink and the radio base station apparatus to connect with on the downlink are the same (step S203: NO), the user terminal UE sets uplink transmission power without using information about the amount of offset, and performs uplink transmission (step S206).

In this way, each radio base station apparatus measures the received quality (for example, the received level) of an uplink reference signal or a data signal from a user terminal, determines the amount of offset (correction value) to correct the propagation loss $PL_c$ based on the measurement result, and reports this to the user terminal, so that it is possible to control uplink transmission power adequately even in a HetNet environment.

Second Example

Uplink transmission power control in the event coordinated multiple point transmission/reception (CoMP) is applied will be described. Note that, in this example, the macro base station B1 and the pico base station B2 will be assigned a common identification code (cell ID).

As configurations to realize CoMP transmission/reception, there are a configuration (centralized control based on a remote radio equipment configuration) to include a radio base station apparatus and a plurality of remote radio equipment (RREs) that are connected with the radio base station apparatus by an optical remote configuration (optical fiber) and a configuration of radio base station apparatuses (autonomous distributed control based on an independent base station configuration). The present example is applicable in either of the above configurations.

FIG. 8 is a schematic diagram to show radio communication in the event downlink coordinated multiple-point transmission (DL CoMP transmission) is adopted. Downlink CoMP transmission includes coordinated scheduling/coordinated beamforming (CS/CB), and joint processing (JP). With this example, a particular case will be described in which, in JP, which involves simultaneous transmission by multiple cells, joint transmission (JT) to transmit from a plurality of cells to one user terminal UE is adopted.

When JT-CoMP is adopted as shown in FIG. 8, CRSs that are transmitted from the macro base station B1 and the pico base station B2 are combined and received at the user terminal UE. In this case, the received level of the CRSs at the user terminal UE relies on both the propagation path between the macro base station B1 and the user terminal UE and the propagation path between the pico base station B1 and the user terminal UE.

Figure 8A:
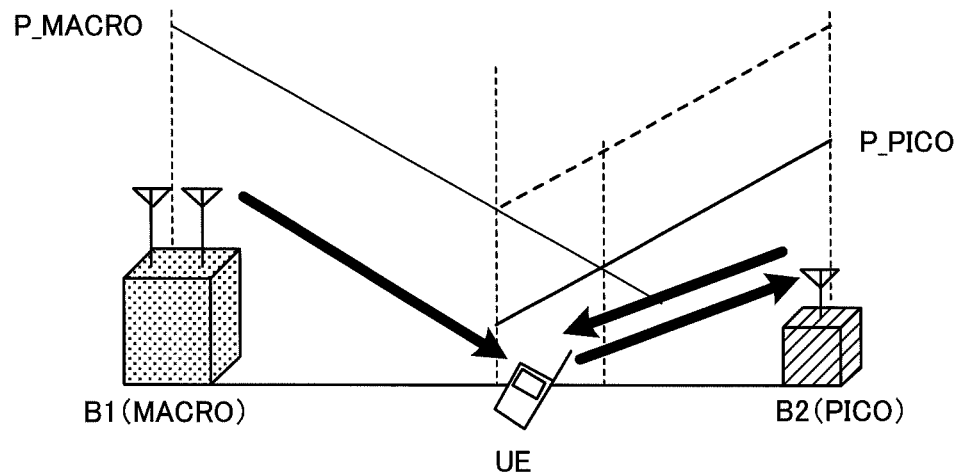
FIG. 8 is a schematic diagram to show the radio communication when downlink coordinated multiple-point transmission by the same cell ID is adopted.

As shown in FIG. 8A, when uplink coordinated multiple-point reception (UL CoMP reception) is not adopted, the user terminal UE is connected with one optimal cell (the pico cell in FIG. 8A) on the uplink. However, the propagation loss $PL_c$ that is estimated based on the received level of CRSs that are combined and received is not estimated based solely on the uplink propagation path. In this case, the path loss is determined to be less than what it really is at the user terminal UE, and therefore the accuracy of the uplink transmission power control decreases. That is to say, it is not possible to determine the propagation loss $PL_c$ to suit the uplink transmission power control from the received level of CRSs that are combined and received.

To make it possible to control uplink transmission power accurately even in such cases, the amount of offset (correction value) for correcting the propagation loss $PL_c$ is reported to the user terminal UE. Also, the amount of offset (correction value) $\Delta_{HetNet}(i)$ is provided in the algorithm of transmission power. In this case, the transmission power of the PUSCH can be represented by equation 4, the transmission power of the PUCCH can be represented by equation 5, and the transmission power of the SRS can be represented by equation 6.

[Formula 8]

$$P_{PUSCH,c}(i) = \\ \min\{P_{CMAX,c}(i), 10\log_{10}(M_{PUSCH,c}(i)) + P_{O\_PUSCH,c}(j) + \\ \alpha_c(j) \cdot PL_c + \Delta_{TF,c}(i) + \Delta_{HetNet}(i) + f_c(i)\}$$ (Equation 4)

[Formula 9]

$$P_{PUCCH}(i) = \\ \min\{P_{CMAX,c}(i), P_{0\_PUCCH} + PL_c + h(n_{CQI}, n_{HARQ}, n_{SR}) + \\ \Delta_{F\_PUCCH}(F) + \Delta_{TxD}(F') + \Delta_{HetNet}(i) + g(i)\}$$ (Equation 5)

[Formula 10]

$$P_{SRS,c}(i) = \\ \min\{P_{CMAX,c}(i), P_{SRS\_OFFSET,c}(m) + 10\log_{10}(M_{SRS,c}) + \\ P_{O\_PUSCH,c}(j) + \alpha_c(j) \cdot PL_c + \Delta_{HetNet}(i) + f_c(i)\}$$ (Equation 6)

In equations 4 to 6, the amount of offset $\Delta_{HetNet}(i)$ is a value to be determined based on the received level of an SRS received on the uplink at each radio base station apparatus. For example, in the case shown in FIG. 8A, the amount of offset $\Delta_{HetNet}(i)$ corresponds to the difference between the combined value of the received levels of an SRS received at the macro base station B1 and the pico base station B2, and the received level of the SRS received at the pico base station B2 (with which the user terminal UE connects on the uplink). In the case shown in FIG. 8A, the combined value of the received levels of an SRS received at the macro base station B1 and the pico base station B2 holds a corresponding relationship with the received level of CRSs combined and received at the user terminal UE. The received level of the SRS received at the pico base station B2 corresponds to the propagation loss that is originally necessary in uplink transmission power control. As described above, by determining the amount of offset $\Delta_{HetNet}(i)$ based on the received level of an SRS received at each radio base station apparatus, it is possible to correct the propagation loss $PL_c$ that is determined based on the received level of a CRS. Note that it is equally possible to determine the amount of offset $\Delta_{HetNet}(i)$ based on the received level of other reference signals or data signals that are transmitted from the user terminal on the uplink and received at each radio base station apparatus.

Referring to above equations 4 to 6, the amount of offset $\Delta_{HetNet}(i)$ may be determined based on the power headroom report (PHR) that is reported in the MAC layer on the uplink, and the received power of a data signal or a reference signal received at the pico base station B2 from the user terminal UE. For example, from the PHR which the user terminal UE reports on a regular basis in the MAC layer, the pico base station B2 to receive this is able to know the transmission power of the user terminal UE, including the propagation loss $PL_c$ measured and retained in the user terminal UE. That is to say, the pico base station B2 is able to learn the transmission power set at the user terminal UE. Based on the difference between the transmission power of the user terminal UE and the actual received level (received quality), it is possible to calculate the actual propagation loss between the pico base station B2 and the user terminal UE. By setting and determining the difference between the propagation loss $PL_c$ measured by the user terminal UE and the actual propagation loss value calculated by the pico base station B2 as the amount of offset and reporting this to the user terminal UE on the downlink via the macro base station B1, it is possible to correct the transmission power error due to propagation loss.

In the case shown in FIG. 8A, the propagation loss $PL_c$ that is determined based on the received level of CRSs that are combined and received at the user terminal UE may be less than an appropriate value. In this case, the amount of offset $\Delta_{HetNet}(i)$ becomes a positive value, and the influence of the error of the propagation loss $PL_c$ on transmission power is corrected.

Figure 8B:
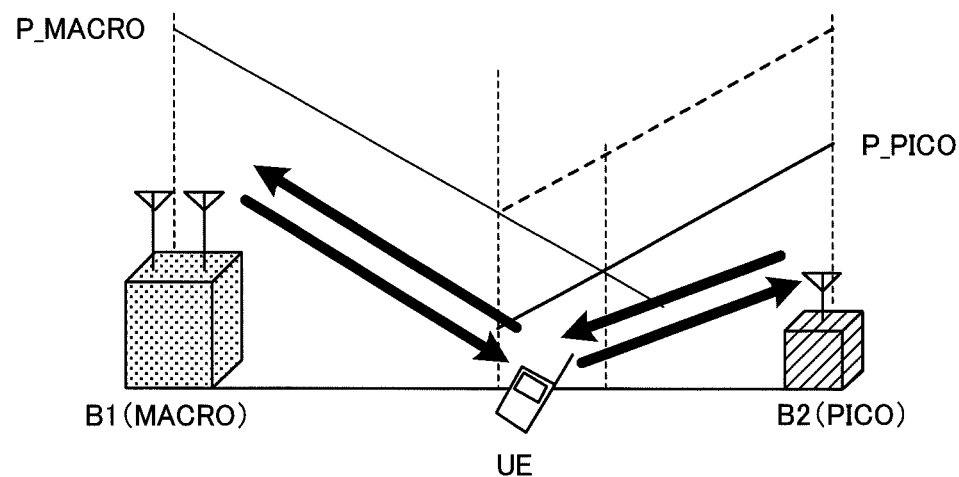

As shown in FIG. 8B, when uplink coordinated multiple-point reception (UL CoMP reception) is applied, data that is transmitted from the user terminal UE is received at the macro cell and the pico cell. In this case, compared to the case where UL CoMP reception is not applied, cases might occur where adequate communication is still possible even when the uplink transmission power is lowered. In this case, compared to the case where UL CoMP reception is not applied, it may be possible to make the offset value $\Delta_{HetNet}(i)$ low. For example, the macro base station B1 may determine whether or not to adopt UL CoMP reception, and report the amount of offset $\Delta_{HetNet}(i)$ that is determined based on that determined result, to the user terminal UE.

With the above method, the amount of offset $\Delta_{HetNet}(i)$ is determined according to the received level of CRSs combined and received, and whether or not UL CoMP reception is applied, it is equally possible to separately provide an amount of offset $\Delta_{CoMP}(i)$ that changes depending on whether or not UL CoMP reception is applied. In this case, the transmission power of the PUSCH can be represented by following equation 7, the transmission power of the PUCCH can be represented by following equation 8, and the transmission power of the SRS can be represented by following equation 9.

[Formula 11]

$$P_{PUSCH,c}(i) = \min\{P_{CMAX,c}(i), 10\log_{10}(M_{PUSCH,c}(i)) + P_{O\_PUSCH,c}(j) + \alpha_c(j) \cdot PL_c + \Delta_{TF,c}(i) + \Delta_{HetNet}(i) + \Delta_{CoMP}(i) + f_c(i)\} \quad \text{(Equation 7)}$$

[Formula 12]

$$P_{PUCCH}(i) = \min\{P_{CMAX,c}(i), P_{O\_PUCCH} + PL_c + h(n_{CQI}, n_{HARQ}, n_{SR}) + \Delta_{F\_PUCCH}(F) + \Delta_{TxD}(F') + \Delta_{HetNet}(i) + \Delta_{CoMP}(i) + g(i)\} \quad \text{(Equation 8)}$$

[Formula 13]

$$P_{SRS,c}(i) = \min\{P_{CMAX,c}(i), P_{SRS\_OFFSET,c}(m) + 10\log_{10}(M_{SRS,c}) + P_{O\_PUSCH,c}(j) + \alpha_c(j) \cdot PL_c + \Delta_{HetNet}(i) + \Delta_{CoMP}(i) + f_c(i)\} \quad \text{(Equation 9)}$$

As explained in the first example, a configuration may be employed in which the error of the propagation loss $PL_c$ is corrected using the amounts of offset $f_c(i)$ and $g(i)$ based on TPC commands. It is equally possible to correct transmission power using the parameter $P_{O\_PUSCH,c}(j)$ to represent the approximate target received power of the UE-specific PUSCH, and the parameter $P_{O\_PUCCH}$ to represent the approximate target received power of the PUCCH.

Note that, although, with the above example, uplink transmission power control is executed by a method of correcting the propagation loss $PL_c$ that is determined based on the received level of a CRS that is received at a user terminal UE, it is equally possible to switch this method to and use another method whereby it is possible to find the propagation loss $PL_c$ more accurately.

For example, the propagation loss $PL_c$ may be estimated accurately based on the received level of a CSI-RS (Channel State Information-Reference Signal) for channel quality measurement. In the LTE/LTE-A system, in addition to the CRS, a DM-RS (Demodulation-Reference Signal) and a CSI-RS are defined as downlink reference signals. A CSI-RS is a reference signal to be used to measure channel state information (CQI, PMI, RI) and is multiplexed over the shared data channel (PDSCH).

A CRS is a cell-specific reference signal and is associated with an identification code (cell ID). When DL CoMP transmission is adopted by a plurality of radio base station apparatuses where a common identification code (cell ID) is assigned, it is not possible to specify where a CRS that is received at the user terminal UE has been transmitted from. Cases might occur where the accuracy of estimation of the propagation loss $PL_c$ that is estimated from the CRS received level is low. Although a CSI-RS is also a cell-specific reference signal, given that a CSI-RS can designate the periodicity and the subframe offset, it is possible to specify the source of transmission from the time where the CSI-RS is multiplexed even when a common identification code (cell ID) is used. In this way, when propagation loss is estimated based on the received level of a CSI-RS, it is possible to estimate propagation loss that corresponds to the transmission source and improve the accuracy of estimation.

When the propagation loss $PL_c$ is estimated based on the received level of a CSI-RS, it is possible to provide an offset value $\Delta_{CoMP}(i)$ that corresponds to whether or not UL CoMP reception is applied, in the algorithm of transmission power. By determining the amount of offset $\Delta_{CoMP}(i)$ according to whether or not UL CoMP reception is applied, it is possible to optimize transmission power even more. In this case, for the algorithm of transmission power, it is possible to use, for example, algorithms in which $\Delta_{HetNet}(i)$ in above-described equation 4 to 6 is replaced by $\Delta_{CoMP}(i)$. Note that the method of estimating the propagation loss $PL_c$ based on the CSI-RS received level may be used alone.

Figure 9:
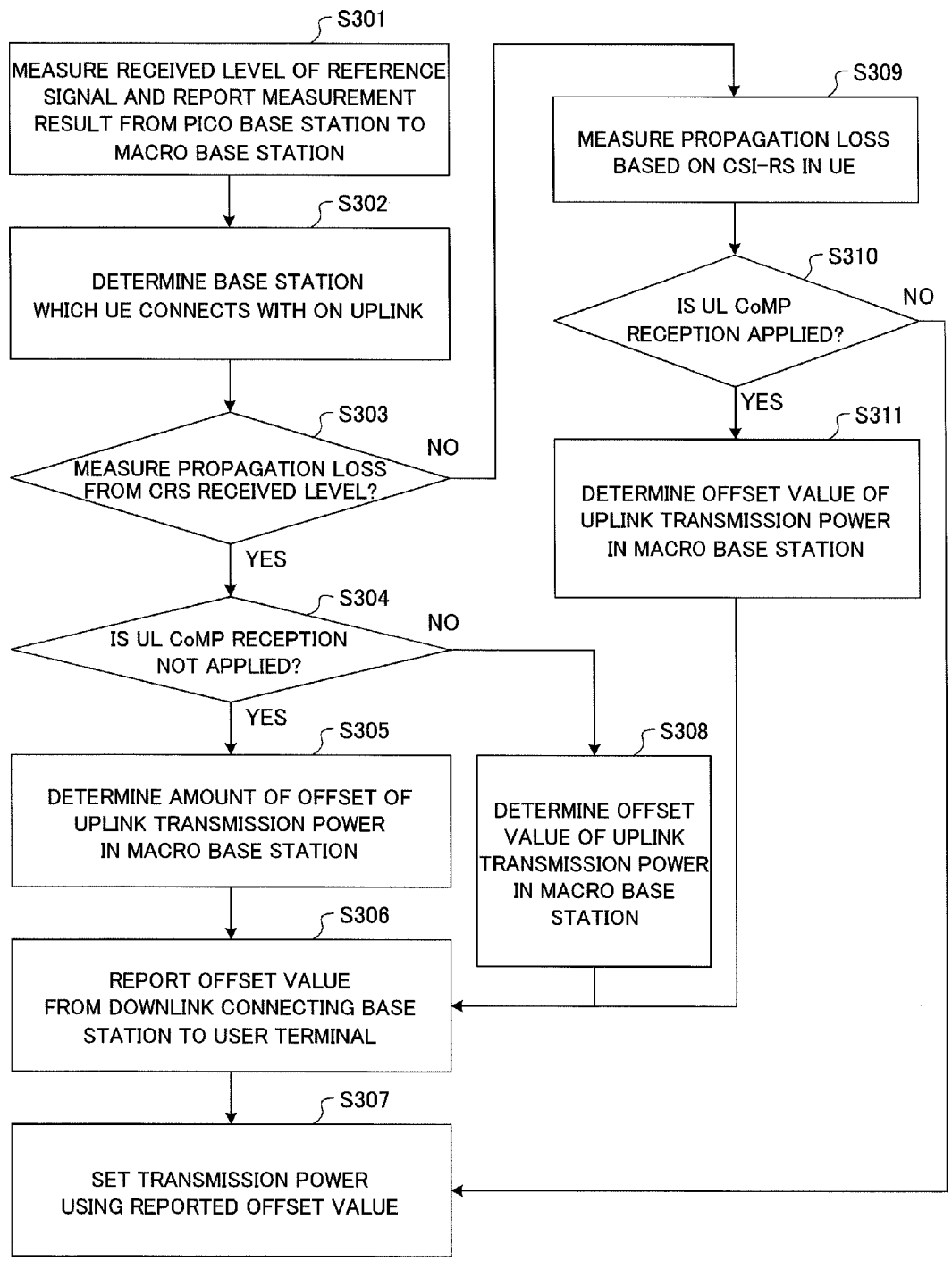
FIG. 9 is a control flowchart of the uplink transmission power control according to a second example.

FIG. 9 is a control flowchart of the uplink transmission power control according to the second example. The macro base station B1 and the pico base station B2 each measure the received level of an SRS that is transmitted from the user terminal UE. The pico base station B2 reports the SRS received level measurement result to the macro base station B1 by backhaul (step S301). Note that it is equally possible to use a reference signal other than an SRS. Next, the macro base station B1 determines the radio base station apparatus which the user terminal UE connects with on the uplink, based on the received levels of the SRS measured at the macro base station B1 and the pico base station B2 (step S302).

When the user terminal UE measures the propagation loss $PL_c$ based on the CRS received level (step S303: YES) and UL CoMP reception is not applied (step S304: YES), the macro base station B1 determines the amount of offset $\Delta_{HetNet}(i)$ to be used to control the uplink transmission power of the user terminal UE based on the received levels of the SRS measured at the macro base station B1 and the pico base station B2 (step S305). The determined amount of offset $\Delta_{HetNet}(i)$ is reported from the radio base station apparatus connected with the user terminal UE on the downlink, to the user terminal UE, by RRC signaling (step S306). The user terminal UE sets the uplink transmission power based on information such as the reported amount of offset $\Delta_{HetNet}(i)$ and so on, and performs uplink transmission (step S307).

Note that when the amount of offset $\Delta_{HetNet}(i)$ is determined based on the PHR that is reported in the MAC layer on the uplink and the received power of a data signal or a reference signal that is received from the user terminal UE at the pico base station B2, instead of above step S104, a step, in which the uplink connecting base station (for example, the pico base station B2) calculates the amount of offset $\Delta_{HetNet}(i)$ to be used in the uplink transmission power control for the user terminal UE based on the measurement value of the received power of the data signal or the reference signal transmitted from the user terminal UE, and the PHR reported from the user terminal UE, may be provided.

When the user terminal UE measures the propagation loss $PL_c$ based on the CRS received level (step S303: YES) and UL CoMP reception is applied (step S304: NO), the macro base station B1 determines the amount of offset $\Delta_{HetNet}(i)$ to be used to control the uplink transmission power of the user terminal UE based on received levels of the SRS measured at the macro base station B1 and the pico base station B2. When the amount of offset $\Delta_{HetNet}(i)$ is determined, the radio base station apparatus where UL CoMP reception is performed is taken into account (step S308). The determined amount of offset $\Delta_{HetNet}(i)$ is reported from the radio base station apparatus which the user terminal UE connects with on the downlink, to the user terminal UE, by RRC signaling (step S306). The user terminal UE sets the uplink transmission power based on information such as the reported amount of offset $\Delta_{HetNet}(i)$ and so on, and performs uplink transmission (step S307). Note that, as described above, it is possible to separately provide an offset value $\Delta_{CoMP}(i)$ that indicates whether or not UL CoMP reception is adopted.

If the user terminal UE does not measure the propagation loss $PL_c$ based on the received level of a CRS (step S303: NO), the user terminal UE measures the propagation loss $PL_c$ based on the received level of CSI-RSs that are transmitted from the macro base station B1 and the pico base station B2 (step S309). Here, when UL CoMP reception is adopted (step S310: YES), the macro base station B1 determines the amount of offset $\Delta_{CoMP}(i)$ taking UL CoMP reception into account (step S311). The determined amount of offset $\Delta_{CoMP}(i)$ is reported to the user terminal UE (step S306), and the user terminal UE sets the uplink transmission power based on information such as the amount of offset $\Delta_{CoMP}(i)$ and so on, and performs uplink transmission (step S307).

When UL CoMP reception is not applied (step S310: NO), the user terminal UE sets the uplink transmission power based on information such as the propagation loss $PL_c$ that is estimated based on the received level of CSI-RSs and so on, and performs uplink transmission (step S307). In this case, the user terminal UE determines the propagation loss based on the received level of a CSI-RS that is transmitted from the radio base station apparatus to connect with on the uplink.

In this way, it is possible to control uplink transmission power adequately by determining the amount of offset (correction value) for correcting the propagation loss $PL_c$ depending on the received level of CRSs that are combined and received and whether or not UL CoMP reception is adopted and reporting this to a user terminal.

Figure 10:
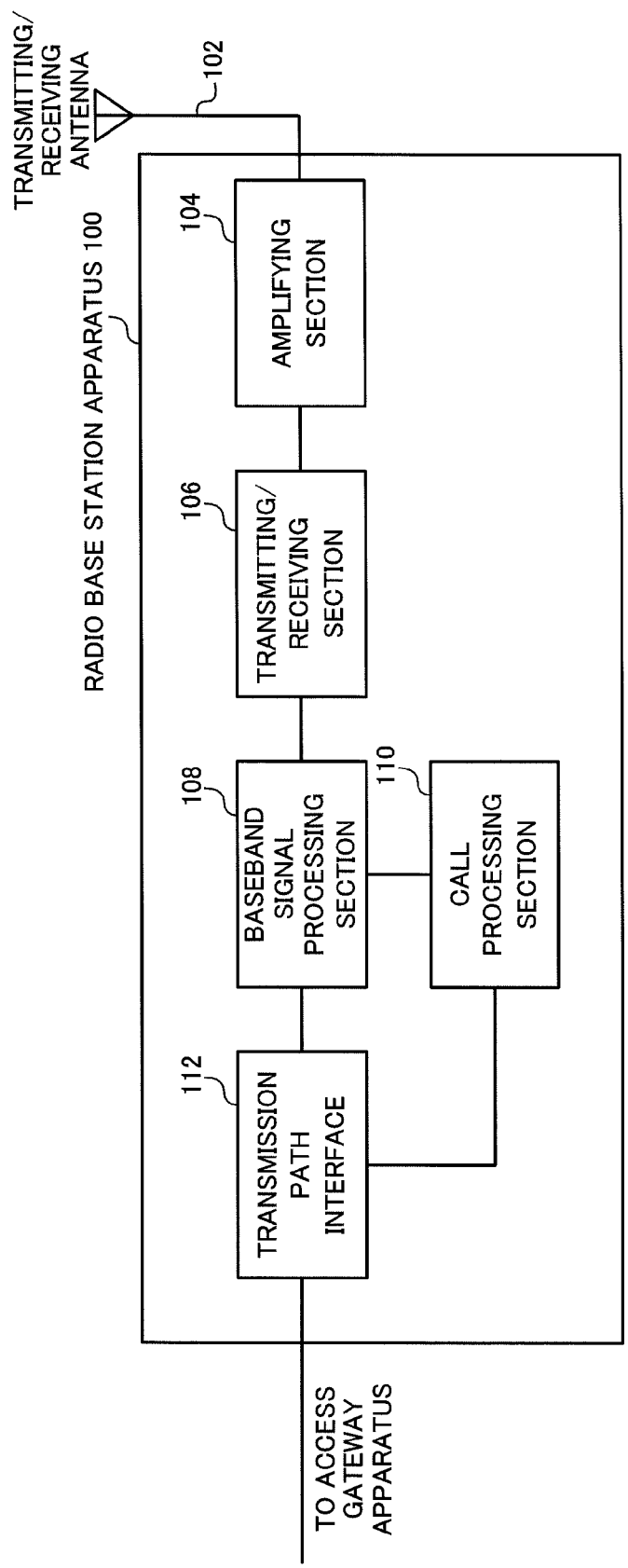
FIG. 10 is a block diagram to show a schematic configuration of a radio base station apparatus.

Now, radio base station apparatuses and user terminals to be applied to the radio communication system according to an embodiment will be described in detail below. FIG. 10 is a block diagram to show a schematic configuration of a radio base station apparatus (a macro base station and a pico base station) according to an embodiment. The radio base station apparatus 100 shown in FIG. 10 is primarily formed with an antenna 102, an amplifying section 104, a transmitting/receiving section 106, a baseband signal processing section 108, a call processing section 110, and a transmission path interface 112.

In the radio base station apparatus 100 of this configuration, as for uplink data, a radio frequency signal that is received in the antenna 102 is amplified in the amplifying section 104. The amplification is carried out such that received power is corrected to certain power under AGC (Auto Gain Control). The amplified radio frequency signal is subjected to frequency conversion into a baseband signal, in the transmitting/receiving section 106. This baseband signal is subjected to predetermined processes (error correction, decoding, and so on) in the baseband signal processing section 108, and transferred to an access gateway apparatus (not shown) via the transmission path interface 112. The access gateway apparatus is connected to a core network and manages each user terminal.

The call processing section 110 transmits and receives call process control signals to and from a radio control station of a higher apparatus, manages the state of the radio base station apparatus 100, and allocates resources. Note that the processes in a layer 1 processing section 181 and a MAC processing section 182, which will be described later, are performed based on the conditions of communication between the radio base station apparatus 100 and a mobile station apparatus 200 set in the call processing section 110.

Downlink data is input in the baseband signal processing section 108, from a higher apparatus, via the transmission path interface 112. In the baseband signal processing section 108, a retransmission control process, scheduling, transport format selection, channel coding and so on are performed, and the result is transferred to the transmitting/receiving section 106. The transmitting/receiving section 106 performs frequency conversion of a baseband signal output from the baseband signal processing section 108, into a radio frequency signal. The signal subjected to frequency conversion is then amplified in the amplifying section 104 and transmitted from the antenna 102.

Figure 11:
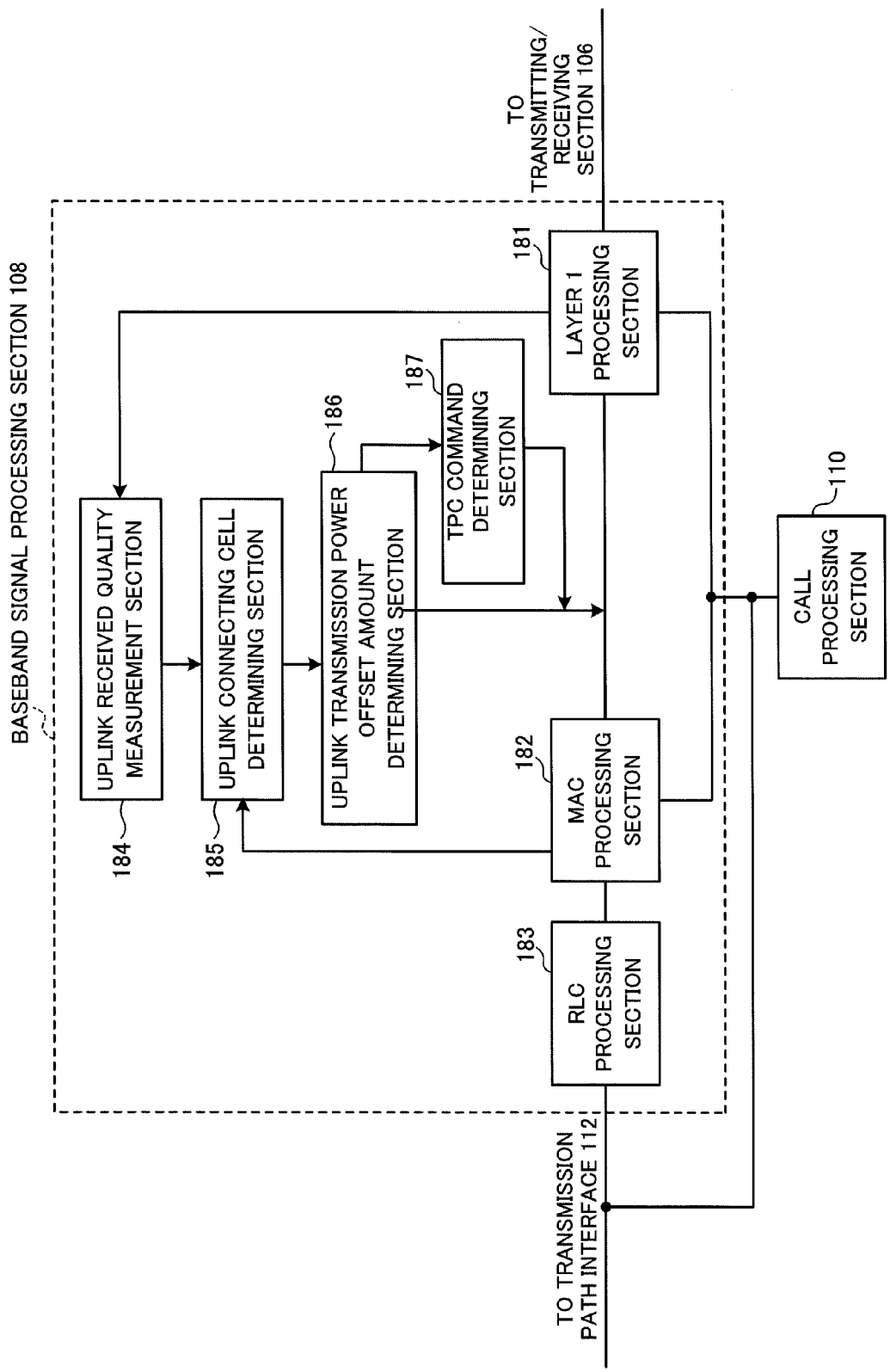
FIG. 11 is a block diagram to show a configuration of a baseband signal processing section in a radio base station apparatus (macro base station)
Figure 12:
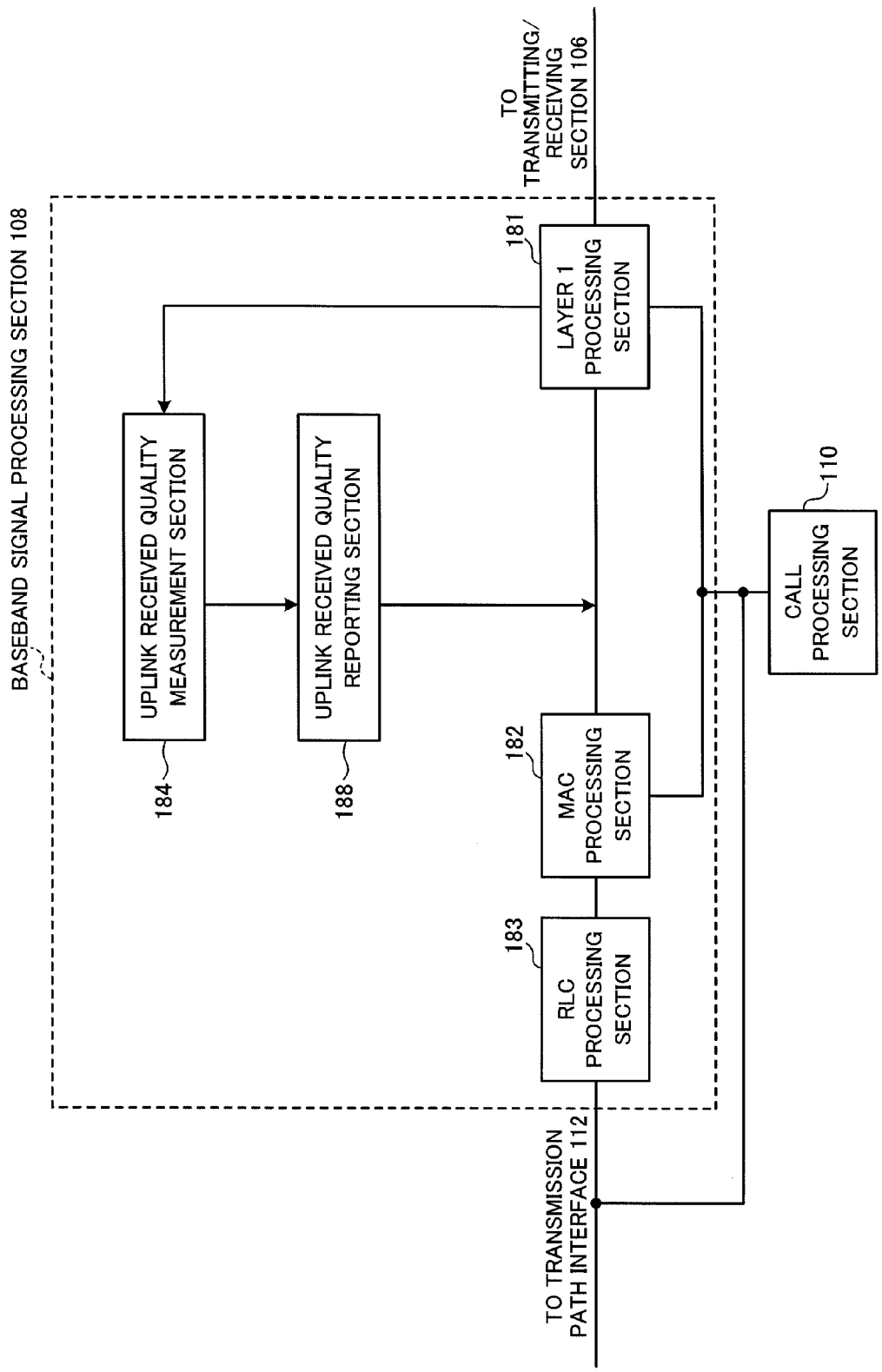
FIG. 12 is a block diagram to show a configuration of a baseband signal processing section in a radio base station apparatus (pico base station)

FIG. 11 and FIG. 12 are block diagrams, each showing a configuration of a baseband signal processing section in the radio base station apparatus shown in FIG. 10. FIG. 11 shows a configuration of a baseband signal processing section in a macro base station, and FIG. 12 shows a configuration of a baseband signal processing section in a pico base station.

As shown in FIG. 11, the baseband signal processing section 108 in the macro base station is primarily formed with a layer 1 processing section 181, a MAC (Medium Access Control) processing section 182, an RLC (Radio Link Control) processing section 183, an uplink received quality measurement section 184, an uplink connecting cell determining section 185, an uplink transmission power offset amount determining section 186 and a TPC command determining section 187. Also, as shown in FIG. 12, the baseband signal processing section 108 in the pico base station is primarily formed with a layer 1 processing section 181, a MAC processing section 182, an RLC processing section 183, an uplink received quality measurement section 184, and an uplink received quality reporting section (reporting section) 188.

The layer 1 processing section 181 mainly performs processes related to the physical layer. The layer 1 processing section 181 performs processes including, for example, channel coding, a discrete Fourier transform (DFT), frequency demapping, an inverse Fourier transform (IFFT) and data demodulation, on a signal received on the uplink. Also, the layer 1 processing section 181 performs processes for a signal to transmit on the downlink, including channel coding, data modulation, frequency mapping, an inverse Fourier transform (IFFT), and so on.

The MAC processing section 182 performs processes such as a MAC layer retransmission control (HARQ) for a signal that is received on the uplink, scheduling for the uplink/downlink, transport format selection for the PUSCH/PDSCH, and resource block selection for the PUSCH/PDSCH.

The RLC processing section 183 performs, for a packet that is received on the uplink/a packet to transmit on the downlink, packet division, packet combining, an RLC layer retransmission control and so on.

The uplink quality measurement section 184 measures the received level of an SRS received from a user terminal on the uplink. Note that when uplink transmission power is corrected using another reference signal, the received level of the subject reference signal is also measured. The received level measured in the uplink quality measurement section 184 is sent to the uplink connecting cell determining section 185 and the uplink transmission power offset amount determining section 186.

The uplink connecting cell determining section 185 determines the radio base station apparatus which the user terminal connects with on the uplink, based on the received level of the SRS received at the macro base station and the received level of the SRS received at a surrounding pico base station. When UL CoMP reception is applied, the radio base station apparatus to be subject to UL CoMP reception is determined.

The uplink transmission power offset amount determining section 186 determines the amount of offset (correction value) for the uplink transmission power of the user terminal, based on the received level of the SRS received at the macro base station and the received level of the SRS received at a surrounding pico base station. Alternately, the amount of offset $\Delta_{HetNet}(i)$ for the uplink transmission power of the user terminal may be determined based on the measurement value of the received power of a data signal or a reference signal received at the pico base station which the user terminal connects with on the uplink, reported from the pico base station by backhaul, and the PHR reported from the user terminal. When UL CoMP reception is applied, the amount of offset (correction value) is determined taking into account the fact that UL CoMP reception is adopted. This amount of offset is reported to the user terminal by RRC signaling. Alternately, the amount of offset may be included in a parameter $P_{O\_PUSCH,c}(j)$, which represents the approximate target received power of an expanded, UE-specific PUSCH, and a parameter $P_{O\_PUCCH}$, which represents the approximate target received power of the PUCCH, and reported to the user terminal by RRC signaling.

The TPC command determining section 187 sets the value of a TPC command from the amount of offset determined in the uplink transmission power offset amount determining section 186. When an expanded TPC command with an expanded number of bits is applied, the value of the expanded TPC commands is set. The TPC command that is set is reported to the user terminal in the PDCCH.

The uplink received quality reporting section 188 reports the SRS received level measured in the uplink quality measurement section 184 of the pico base station to the uplink connecting cell determining section 185 and the uplink transmission power offset amount determining section 186 of the macro base station. Also, when step S104' shown in FIG. 5 is provided, based on the measurement value of the received power of a data signal or a reference signal that is received at the pico base station, and the PHR that is reported from the user terminal, the amount of offset $\Delta_{HetNet}(i)$ for the uplink transmission power of the user terminal is calculated, and reported to the uplink transmission power offset amount determining section 186 of the macro base station.

Figure 13:
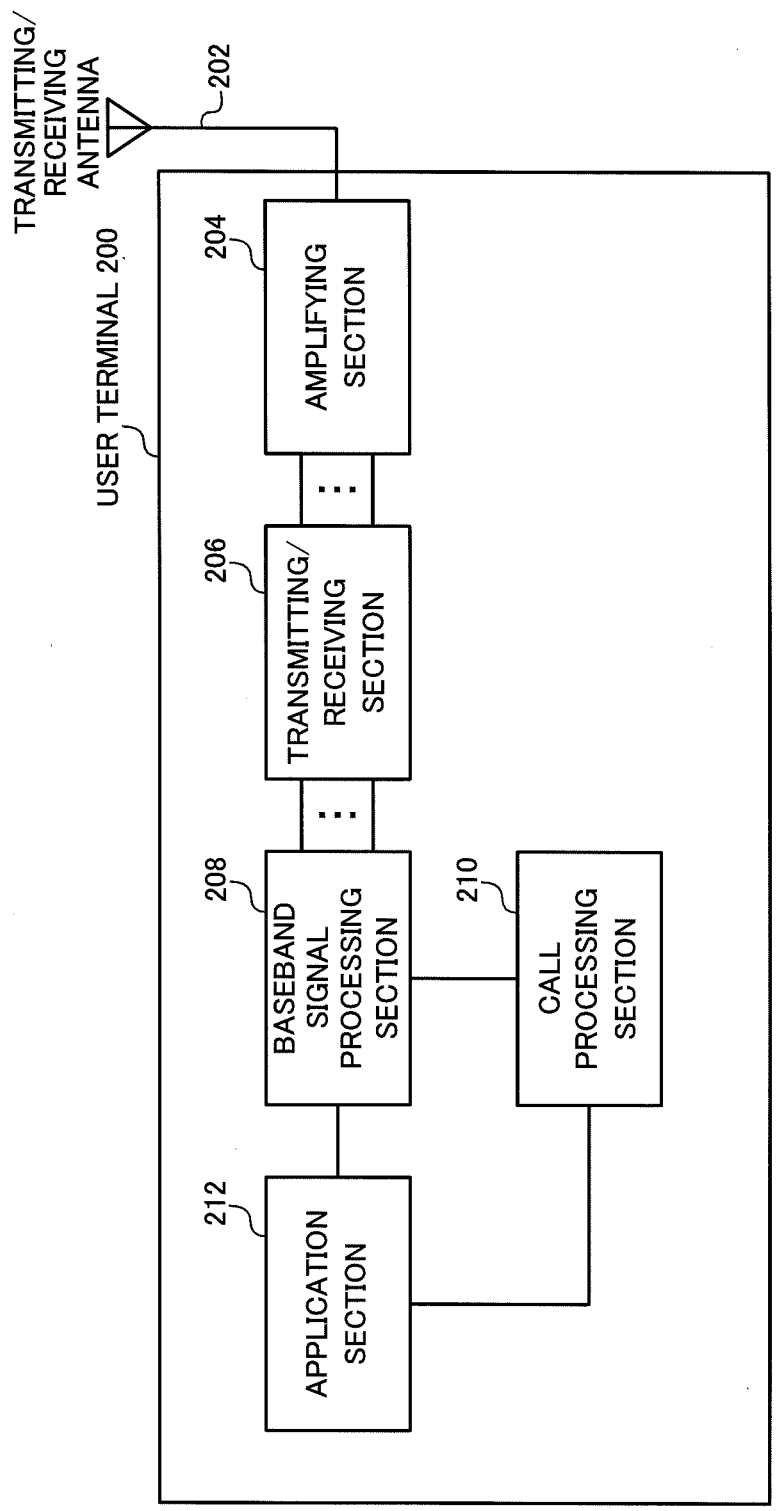
FIG. 13 is a block diagram to show a schematic configuration of a user terminal.

FIG. 13 is a block diagram showing a schematic configuration of a user terminal according to an embodiment. The user terminal 200 shown in FIG. 13 is primarily formed with an antenna 202, an amplifying section 204, a transmitting/receiving section 206, a baseband signal processing section 208, a call processing section 210, and an application section 212.

In the user terminal 200 of this configuration, as for downlink data, a radio frequency signal that is received in the antenna 202 is amplified in the amplifying section 204. The application is performed to correct received power to certain power under AGC. The amplified radio frequency signal is subjected to frequency conversion into a baseband signal, in the transmitting/receiving section 206. This baseband signal is subjected to predetermined processes (error correction, decoding, and so on) in the baseband signal processing section 208, and then sent to the call processing section 210 and the application section 212. The call processing section 210 manages communication with the radio base station apparatus 100 and so on, and the application section 212 performs processes related to higher layers above the physical layer and the MAC layer.

Uplink data is input from the application section 212 into the baseband signal processing section 208. In the baseband signal processing section 208, a retransmission control process, scheduling, transport format selection, channel coding and so on are performed, and the result is transferred to the transmitting/receiving section 206. The transmitting/receiving section 206 performs frequency conversion of the baseband signal output from the baseband signal processing section 208, into a radio frequency signal. The signal subjected to frequency conversion is then amplified in the amplifying section 204 and transmitted from the antenna 202.

Figure 14:
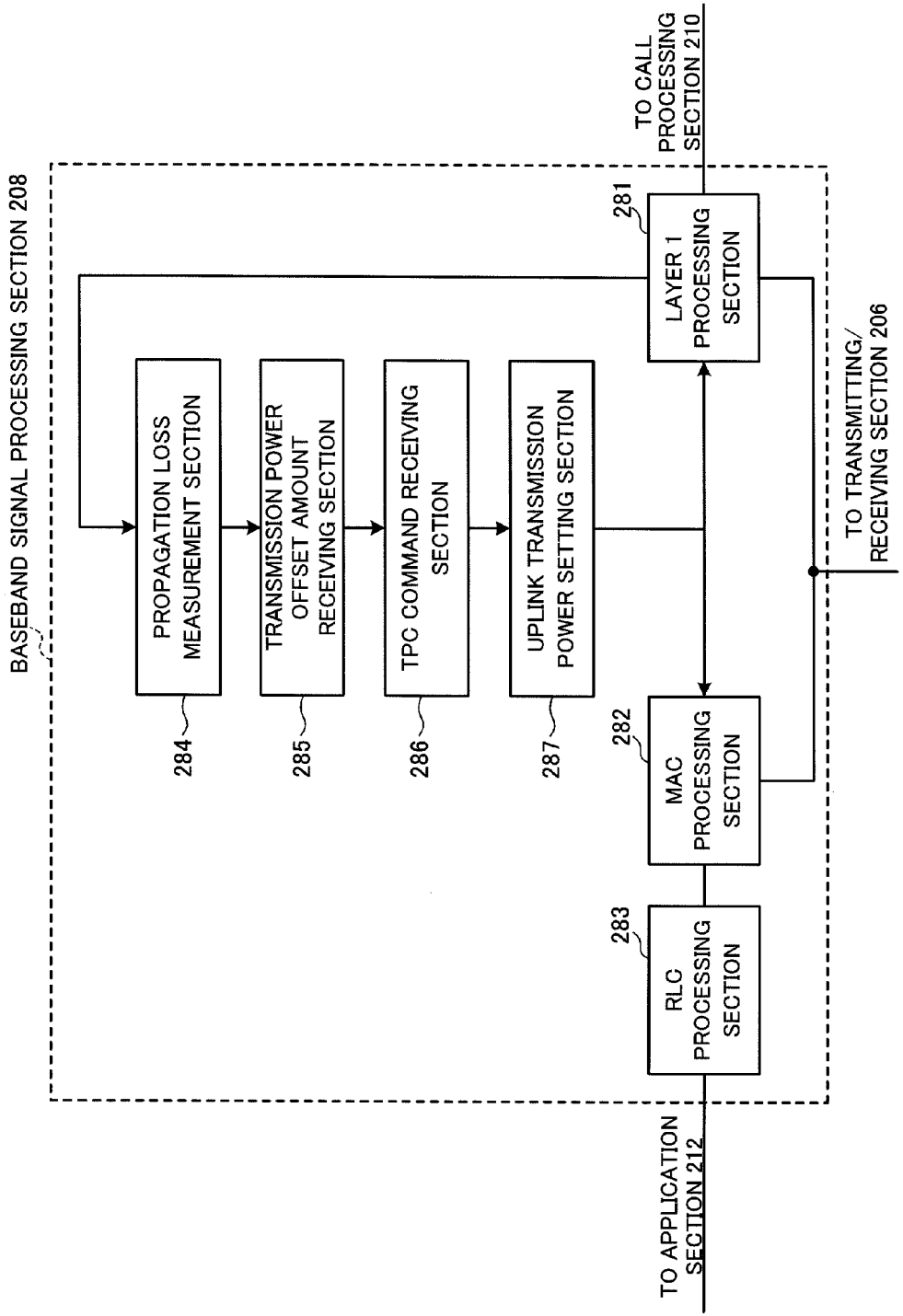
FIG. 14 is a block diagram to show a configuration of a baseband signal processing section in a user terminal.

FIG. 14 is a block diagram showing a configuration of a baseband signal processing section in the user terminal shown in FIG. 13. A baseband signal processing section 208 is formed with a layer 1 processing section 281, a MAC processing section 282, an RLC processing section 283, a propagation loss measurement section 284, a transmission power offset amount receiving section 285, a TPC command receiving section 286, and an uplink transmission power setting section 287.

The layer 1 processing section 281 mainly performs processes related to the physical layer. The layer 1 processing section 281 performs processes for a signal that is received on the downlink, such as, for example, channel decoding, a discrete Fourier transform (DFT), frequency demapping, an inverse fast Fourier transform (IFFT), data demodulation and so on. Also, the layer 1 processing section 281 performs processes for a signal to transmit on the uplink, such as channel coding, data modulation, frequency mapping, an inverse Fourier transform (IFFT), and so on.

The MAC processing section 282 performs, for a signal that is received on the downlink, a MAC layer retransmission control (HARQ), an analysis of downlink scheduling information (specifying the PDSCH transport format and specifying the PDSCH resource blocks), and so on. Also, the MAC processing section 282 performs, for a signal to transmit on the uplink, a MAC retransmission control, an analysis of uplink scheduling information (specifying the PUSCH transport format and specifying the PUSCH resource blocks), and so on.

The RLC processing section 283 performs, for a packet received on the downlink/a packet to transmit on the uplink, packet division, packet combining, an RLC layer retransmission control and so on.

The propagation loss measurement section 284 measures the propagation loss based on the received level of a CRS that is received on the downlink. When a CSI-RS is used to measure propagation loss, the propagation loss is measured based on the received level of the CSI-RS.

The transmission power offset amount receiving section 285 receives the amount of offset of transmission power reported on the downlink by RRC signaling. When there are a plurality of amounts of offset (for example, when $\Delta_{HetNet}(i)$ and $\Delta_{CoMP}(i)$ are used), a plurality of transmission power offset amounts are received.

The TPC command receiving section 286 receives a TPC command reported in the PDCCH on the downlink. When a TPC command with an expanded number of bits is adopted, an expanded TPC command is received.

The uplink transmission power setting section 287 sets the uplink transmission power based on equations 4 to 6, using the propagation loss value measured in the propagation loss measurement section 284, the amount of transmission power offset received at the transmission power offset amount receiving section 285, the value of the TPC command received at the TPC command receiving section 286, and so on.

As described above, with the present invention, the amount of offset (correction value) for correcting propagation loss $PL_c$ is determined based on the received level of an uplink reference signal or a data signal from a user terminal, measured at each radio base station apparatus, taking into account the connecting cells on the uplink and the downlink, the received level of CRSs that are combined and received, whether or not UL CoMP reception is applied, and so on, and reported to a user terminal. By this means, it is possible to provide a radio communication system, a radio base station apparatus, a user terminal, and a radio communication method which can control uplink transmission power adequately even in a HetNet environment.

Note that the present invention is not limited to the above embodiment and can be implemented in various modifications. For example, the relationships of connections and functions of the components in the above embodiment can be implemented with various changes. Also, the configurations shown in the above embodiment can be implemented in various adequate combinations. Besides, the present invention can be changed with various changes without departing from the spirit of the present invention.

The disclosure of Japanese Patent Application No. 2011-177267, filed on Aug. 12, 2011, including the specification, drawings and abstract, is incorporated herein by reference in its entirety.

The invention claimed is:

1. A user terminal comprising:
    a transmission section that transmits an SRS (sounding reference signal) to a first radio base station apparatus and a second radio base station apparatus;
    a receiving section that receives information about transmission power of the SRS by RRC (Radio Resource Control) signaling; and
    a setting section that sets the transmission power of the SRS using an amount of offset per SRS type m, $P_{SRS\_OFFSET,c}(m)$ that is expanded in range based on the information.

2. The user terminal according to claim 1, wherein the receiving section receives the information when a cell to connect on uplink is different from a cell to connect on downlink.

3. The user terminal according to claim 1, wherein the receiving section receives the information when the first radio base station apparatus and the second radio base station apparatus coordinated-multiple-point-transmit signals to the user terminal and the first radio base station apparatus and the second radio base station apparatus coordinated-multiple-point-receive signals from the user terminal.

4. The user terminal according to claim 1, wherein the receiving section receives the information when the first radio base station apparatus and the second radio base station apparatus coordinated-multiple-point-transmit signals to the user terminal and the first radio base station apparatus and the second radio base station apparatus do not coordinated-multiple-point-receive signals from the user terminal.

5. A radio base station apparatus comprising:
  a receiving section that receives an SRS (sounding reference signal) from a user terminal; and
  a transmitting section that transmits information about transmission power of the SRS to the user terminal by RRC (Radio Resource Control) signaling,
  wherein the information is used, by the user terminal, to expand an amount of offset per SRS type m, $P_{SRS\_OFFSET,c}(m)$ in range when setting the transmission power of the SRS.

6. A radio communication method comprising the steps of:
  transmitting an SRS (sounding reference signal) to a first radio base station apparatus and a second radio base station apparatus;
  receiving information about transmission power of the SRS by RRC (Radio Resource Control) signaling; and
  setting the transmission power of the SRS using an amount of offset per SRS type m, $P_{SRS\_OFFSET,c}(m)$ that is expanded in range based on the information.

7. A radio communication system comprising: a first radio base station apparatus; a second radio base station apparatus; and a user terminal, the user terminal comprising:
  a transmission section that transmits an SRS (sounding reference signal) to the first radio base station apparatus and the second radio base station apparatus;
  a receiving section that receives information about transmission power of the SRS by RRC (Radio Resource Control) signaling; and
  a setting section that sets the transmission power of the SRS using an amount of offset per SRS type m, $P_{SRS\_OFFSET,c}(m)$ that is expanded in range based on the information.

* * * * *